(12) United States Patent
Yoshifuji et al.

(10) Patent No.: US 8,648,876 B2
(45) Date of Patent: Feb. 11, 2014

(54) DISPLAY DEVICE

(75) Inventors: Kazunari Yoshifuji, Tokyo (JP);
Takanori Ishikawa, Saitama (JP); Yota Komoriya, Tokyo (JP); Isao Ohashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 130 days.

(21) Appl. No.: 13/064,577

(22) Filed: Apr. 1, 2011

(65) Prior Publication Data

US 2011/0316881 A1 Dec. 29, 2011

(30) Foreign Application Priority Data

Jun. 24, 2010 (JP) ................................. 2010-143867

(51) Int. Cl.
*G09G 5/00* (2006.01)
*H04N 13/04* (2006.01)
*H04N 9/47* (2006.01)

(52) U.S. Cl.
USPC .................. 345/619; 348/54; 348/51; 348/59

(58) Field of Classification Search
USPC ................... 345/629, 619; 348/59, 42, 51, 54
See application file for complete search history.

(56) References Cited

U.S. PATENT DOCUMENTS

| | | | | |
|---|---|---|---|---|
| 5,986,804 A | * | 11/1999 | Mashitani et al. | 359/462 |
| 2010/0060722 A1 | * | 3/2010 | Bell | 348/51 |
| 2011/0032346 A1 | * | 2/2011 | Kleinberger | 348/59 |
| 2011/0193863 A1 | * | 8/2011 | Gremse et al. | 345/419 |
| 2011/0310233 A1 | * | 12/2011 | Bathiche et al. | 348/51 |

FOREIGN PATENT DOCUMENTS

| | | |
|---|---|---|
| JP | 3544171 | 4/2004 |
| JP | 2008-170841 | 7/2008 |
| WO | WO 2010049868 A1 * | 5/2010 |

* cited by examiner

*Primary Examiner* — Xiao M. Wu
*Assistant Examiner* — Scott E Sonners
(74) *Attorney, Agent, or Firm* — Rader, Fishman & Grauer PLLC

(57) ABSTRACT

There is provided a display including a display unit which periodically arranges and displays a plurality of view images, an acquisition unit which acquires information on a position of an observer, a calculation unit which sets a target viewing zone based on the information on the position of the observer, and a control unit which selects an arrangement of the view images that gives a viewing zone similar to the target viewing zone.

18 Claims, 17 Drawing Sheets

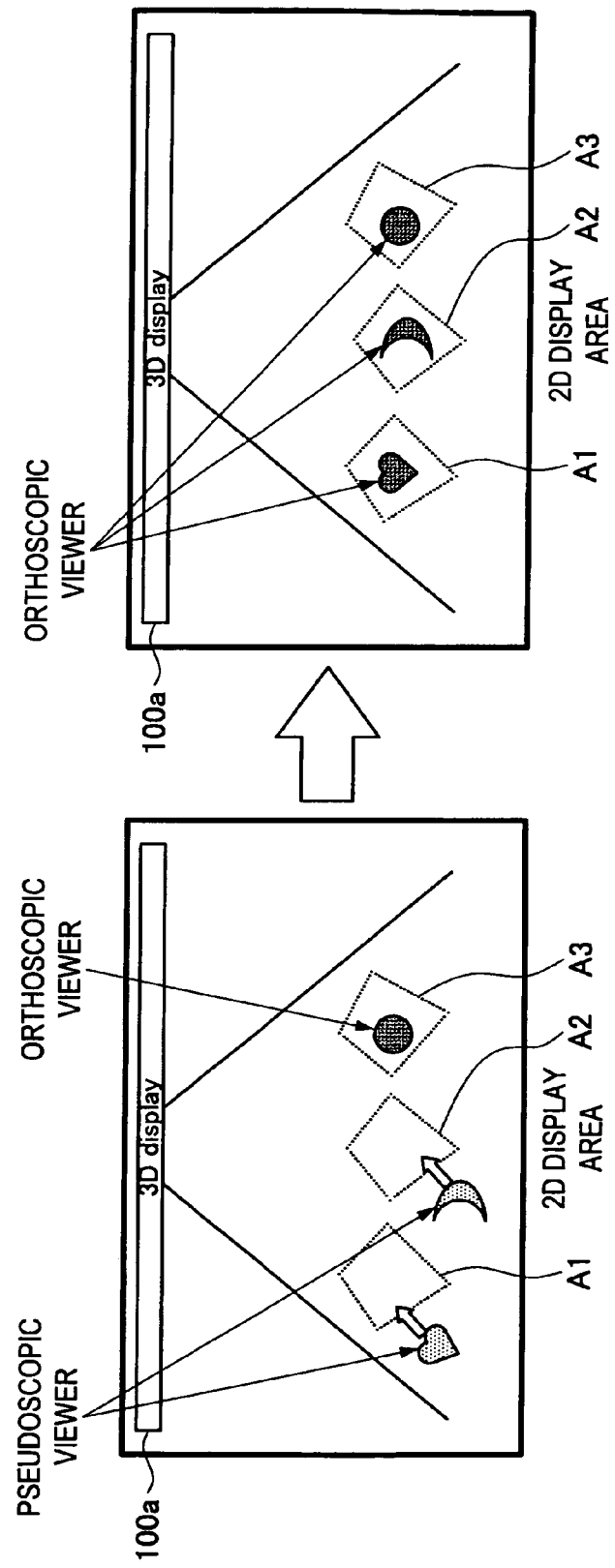

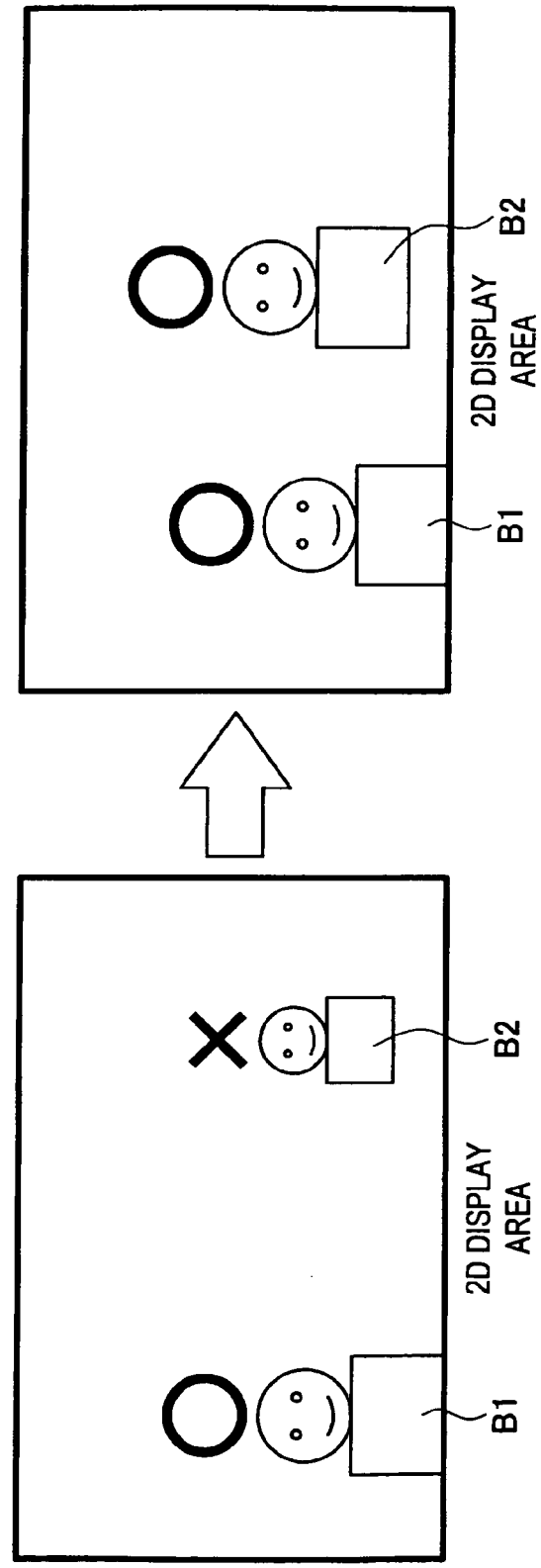

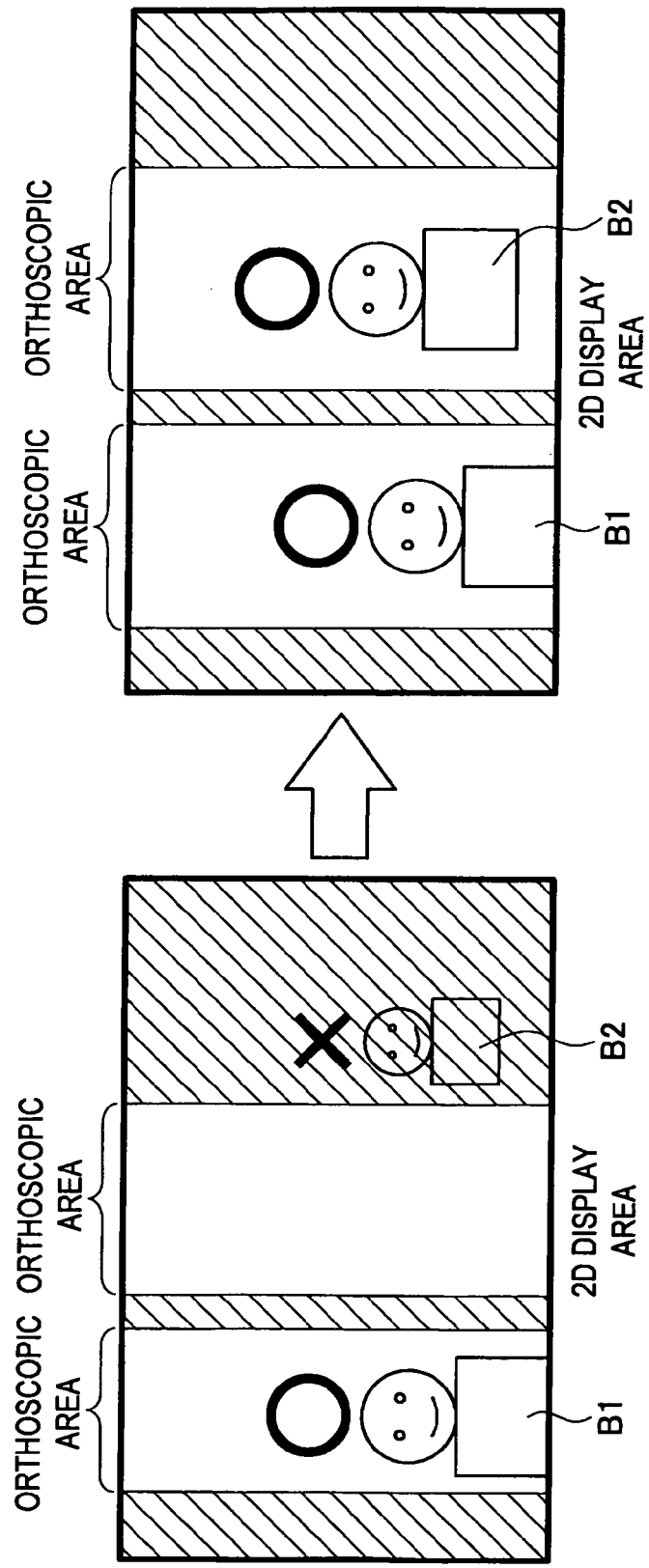

DISPLAY DEVICE

BACKGROUND

The present disclosure relates to a display device that enables viewing of a stereoscopic video.

A glasses-based stereoscopic display that enables viewing of stereoscopic videos by guiding view images (or disparity images) based on different polarization states to left and right eyes using glasses is coming into widespread use today. Further, an autostereoscopic display that enables viewing of stereoscopic images without using glasses is under development and attracting attention.

As a method of showing stereoscopic images in the glasses-based stereoscopic display, a method that guides prescribed view images out of a plurality of view images to eyeballs of a viewer using a parallax element such as a parallax barrier or a lenticular lens is proposed. The stereoscopic display device using the parallax barrier has a structure that videos formed by light rays passing through the apertures of the parallax barrier are different view images for the respective eyes.

While the autostereoscopic display device has an advantage that stereoscopic viewing is possible without the need for special glasses, it has the following issue. Referring to FIG. 17, view images are arranged periodically (views 1, 2, 3, 4, 1, 2, 3, 4, . . . ) in pixels on a liquid crystal display 100a. Therefore, at the boundary of the respective periods, which is the border of the period of four video data (the view 4 and the view 1), pseudoscopy occurs in which a view video to enter the right eye is guided to the left eye, and a view video to enter the left eye is guided to the right eye. In the pseudoscopic zone, the pseudoscopic phenomenon occurs that gives a viewer an unnatural and uncomfortable feeling, perceiving a video in which the front and the back of a stereoscopic image are inverted or look unnaturally blended.

There have been proposed attempts to remove the discomfort of a viewer against the pseudoscopy as much as possible (refer to Patent Document 1 (Japanese Patent No. 3544171) and Patent Document 2 (Japanese Patent Publication No. 2008-170841), for example). In the method in Patent Document. 1, the position of a viewer or the like is detected, and optical control is performed based on information on the position, thereby relieving the discomfort of the viewer against the pseudoscopy. In the method in Patent Document 2, a rotation angle of the view position of a viewer with respect to the predetermined axis of a display panel is detected. Then, control is performed so that the display position of an input image for a right eye and the display position of an input image for a left eye are interchanged on the display panel, based on the rotation angle. The discomfort of a viewer against the pseudoscopy is thereby relieved.

SUMMARY

However, neither of the methods in Patent Documents 1 and 2 can propose an effective solution for relieving the discomfort of a viewer against the pseudoscopy in view of a situation where an autostereoscopic display is installed in a living room, like a common TV, and a plurality of viewers are normally present. Further, the pseudoscopy occurs in the autostereoscopic display in principle. Thus, it is difficult to ultimately solve the problem caused by the pseudoscopy. Accordingly, a substantial solution to the problem caused by the pseudoscopy is to propose a method of increasing a frequency at which a viewer may view a stereoscopic video in a viewing zone not affected by the pseudoscopy.

In light of the foregoing, it is desirable to provide a novel and improved display device capable of increasing a frequency at which a viewer may view a video in a viewing zone.

According to an embodiment of the present disclosure, there is provided a display including a display unit which periodically arranges and displays a plurality of view images, an acquisition unit which acquires information on a position of an observer, a calculation unit which sets a target viewing zone based on the information on the position of the observer, and a control unit which selects an arrangement of the view images that gives a viewing zone similar to the target viewing zone.

The calculation unit may calculate the target viewing zone so that the number of observers who are located in the viewing zone is the largest.

According to another embodiment of the present disclosure, there is provided a display device including a display unit which periodically arranges and displays a plurality of view images, an acquisition unit which acquires information on attributes of an observer. a calculation unit which sets a target viewing zone based on the information on the attributes of the observer, and a control unit which selects an arrangement of the view images that gives a viewing zone similar to the target viewing zone.

The calculation unit may determine that the appropriate target viewing zone cannot be calculated, the calculation unit notifies the control unit that the appropriate target viewing zone cannot be calculated.

The control unit may display the selected arrangement of the view images on the display unit in response to the notification.

As described above, according to the stereoscopic display device in each embodiment of the present disclosure, a frequency at which the observer may view a stereoscopic video within the viewing zone may be increased.

BRIEF DESCRIPTION OF THE DRAWINGS

FIG. 16A shows a display example 1 of an OSD image according to the fifth embodiment;

FIG. 16B shows a display example 2 of an OSD image according to the fifth embodiment;

FIG. 16C shows a display example 3 of an OSD image according to the fifth embodiment.

DETAILED DESCRIPTION OF THE EMBODIMENT(S)

Figure 1:
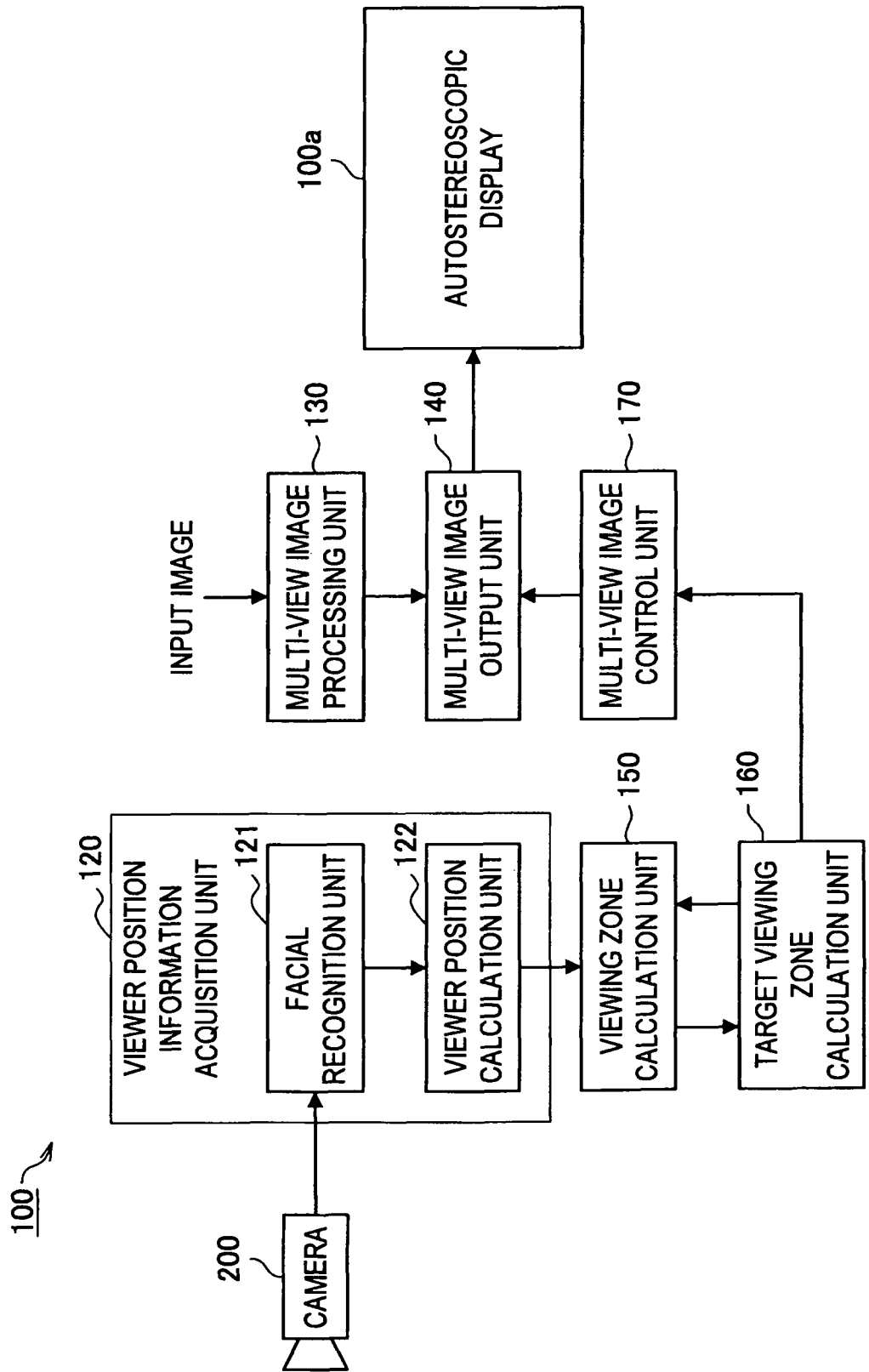
FIG. 1 is a functional block diagram of a stereoscopic display device according to a first embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Embodiments of the present disclosure will be described in the following order.
<First Embodiment>
[Schematic Structure of Stereoscopic Display Device]
[Functional Structure of Stereoscopic Display Device]
[Operation of Stereoscopic Display Device]
<Second Embodiment>
[Functional Structure of Stereoscopic Display Device]
[Operation of Stereoscopic Display Device]
<Third Embodiment>
[Operation of Stereoscopic Display Device]
<Fourth Embodiment>
[Operation of Stereoscopic Display Device]
<Fifth Embodiment>
[Functional Structure of Stereoscopic Display Device]
(Display Screen Example)
[Operation of Stereoscopic Display Device]
(Display Example 1)
(Display Example 2)
(Display Example 3)

Stereoscopic display devices according to first to fifth embodiments are described hereinafter. The following description is based on the assumption that the stereoscopic display device according to each embodiment is an autostereoscopic display device which includes a stereoscopic display that inputs light from light sources and displays a plurality of view images of contents, and a parallax element such as a parallax barrier or a lenticular lens that is placed in front of a pixel plane of the stereoscopic display and separates a right-eye image and a left-eye image from a plurality of view images. The parallax element may be a 3D-fixed passive element or a 2D/3D switchable active element, although not particularly limited in each embodiment.

First Embodiment

[Schematic Structure of Stereoscopic Display Device]

Figure 2:
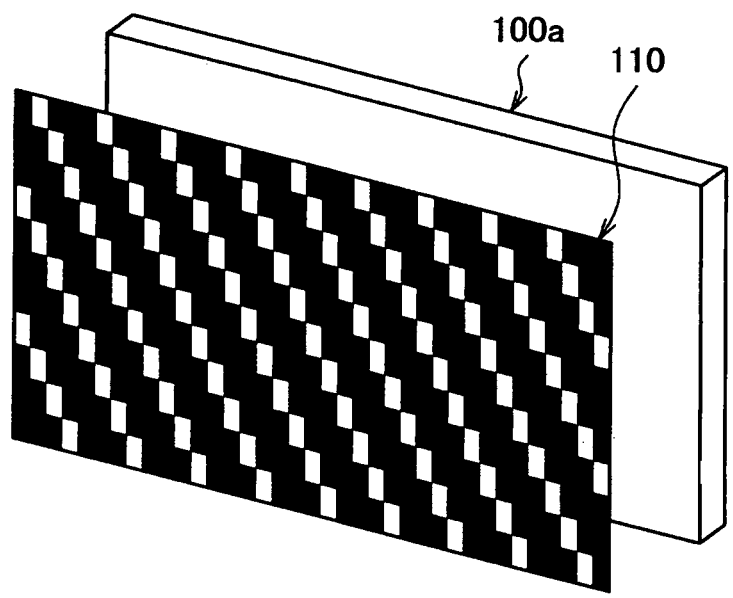
FIG. 2 is a view to explain a schematic structure of a stereoscopic display and a parallax barrier according to first to fifth embodiments.
Figure 17:
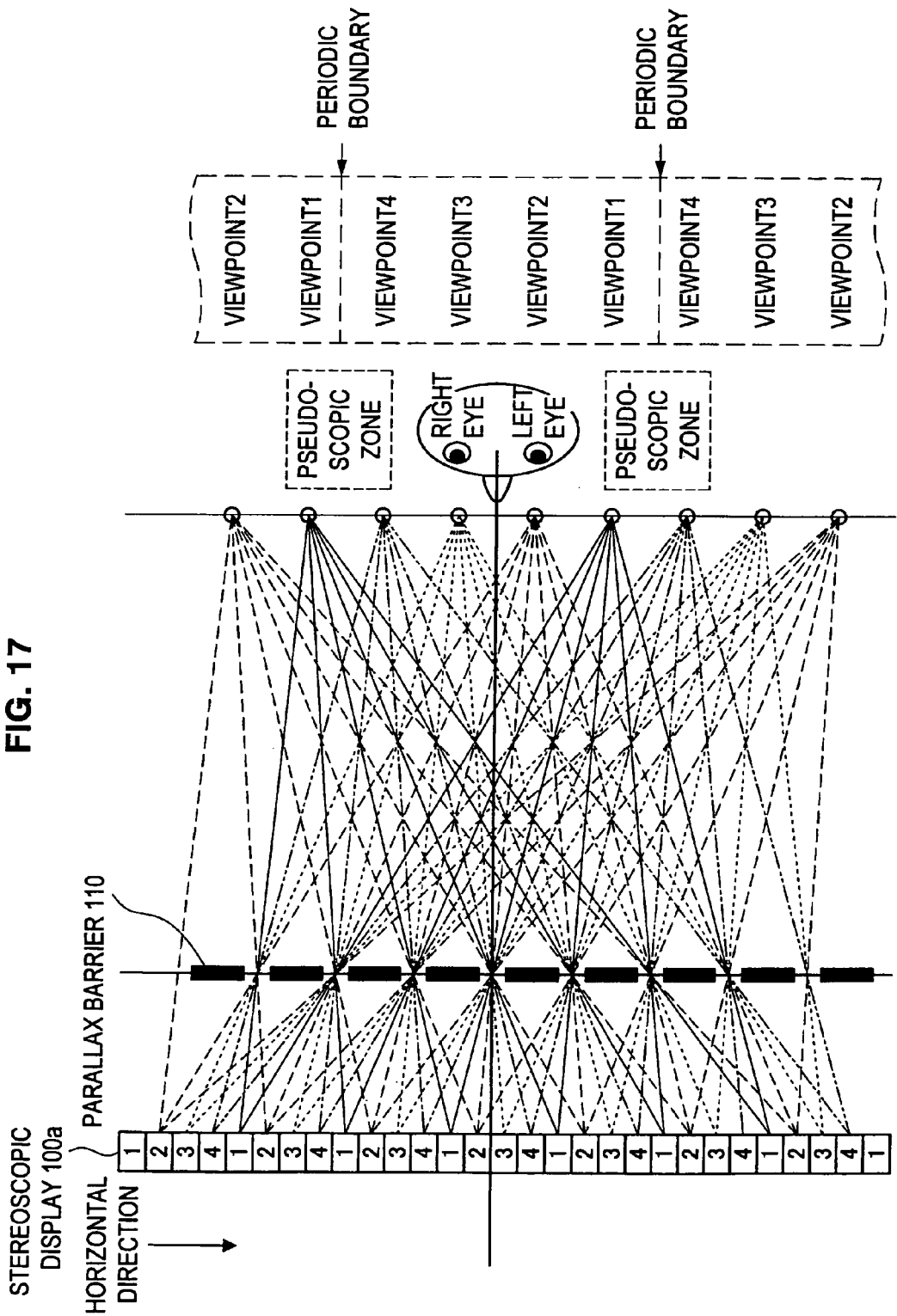
FIG. 17 is a schematic block diagram of a stereoscopic display using a parallax barrier according to the first to fifth embodiments.

A schematic structure of a stereoscopic display device according to the first embodiment of the present disclosure is described firstly with reference to FIGS. 2 and 17. In this embodiment, a parallax barrier 110 is placed in front of a pixel plane of a stereoscopic display 100a as shown in FIG. 2. Because a viewer views a video through the parallax barrier 110, only an image for the right eye enters the right eye, and only an image for the left eye enters the left eye in the orthoscopic zone. A video seen by the right eye and a video seen by the left eye are different in this manner, so that a video shown on the stereoscopic display 100a looks stereoscopic. Hereinafter, a viewer may be called an observer.

FIG. 17 shows a top view of a stereoscopic display device using a parallax barrier. FIG. 17 illustrates pixels in the horizontal direction of a liquid crystal display of an autostereoscopic display device 100. In the case of the stereoscopic display 100a of FIG. 17 with four points of views, four view images are divided vertically and arranged periodically at the respective pixel positions of the stereoscopic display 100a. Light from a light source, not shown, is input to the stereoscopic display 100a, and the parallax barrier 110 having an apertures is placed in front of the stereoscopic display 100a, so that the view images 1 to 4 are spacially separated from one another. An image for the right eye and an image for the left eye can be thereby seen by the right eye and the left eye, respectively. Note that, use of a lenticular lens instead of the parallax barrier 110 also allows separation of videos for the right eye and the left eye with no glasses. A mechanism that separates light from the stereoscopic display 100a, such as the parallax barrier or the lenticular lens, is also called a light separating unit.

At the moment, the parallax barrier 110 and the image have the same period. If a view video for the left eye is guided to the left eye and a view video for the right eye is guided to the right eye in a correct manner, a correct stereoscopic image can be seen. In FIG. 17, because a view 2 enters the left eye, and a view 3 enters the right eye, a correct video can be seen.
(Pseudoscopy)

As described above, the autostereoscopic display device has an advantage that enables stereoscopic viewing without the need for special glasses. However, as described above, because a plurality of view images are periodically arranged in the respective pixels of the stereoscopic display 100a, a pseudoscopic zone where a view video to enter the right eye is guided to the left eye and a view video to enter the left eye is guided to the right eye exists at the boundary between the periods. For example, because view images are periodically arranged like 1, 2, 3, 4, 1, 2, 3, 4, . . . in FIG. 17, the border of the period of four video data (the view 4 and the view 1) serve as the pseudoscopic zone where a view video to enter the right eye is guided to the left eye and a view video to enter the left eye is guided to the right eye. In the pseudoscopic zone, the pseudoscopic phenomenon occurs which gives a viewer an unnatural and uncomfortable feeling, perceiving a video in which the front and the back of a stereoscopic image are inverted or look unnaturally blended. Thus, for stereoscopic videos, it is necessary to reduce the uncomfortable feeling of a viewer against the pseudoscopic phenomenon. In view of this, a method for increasing the frequency that a viewer can view stereoscopic images in the orthoscopic zone without affected by the pseudoscopic phenomenon is proposed in the following embodiments.
[Functional Structure of Stereoscopic Display Device]

The functional structure of the stereoscopic display device according to the embodiment is described hereinafter with reference to the functional block diagram of FIG. 1. The stereoscopic display device 100 according to the embodiment includes a viewer position information acquisition unit 120 (which corresponds to a position information acquisition unit), a multi-view image processing unit 130 that receives or generates a multi-view image, a multi-view image output unit 140 that outputs a multi-view image to the stereoscopic display 100a, a viewing zone calculation unit 150 that calculates a viewing zone based on a design value of the autostereoscopic display 100a and an output state from the multi-view image output unit 140, a target viewing zone calculation unit 160 that calculates a target viewing zone based on a calculation result of a viewer position calculation unit 122, and a multi-view image control unit 170 that controls the multi-view image output unit 140 by using a calculation result of the viewing zone calculation unit 150 and a calculation result of the target viewing zone calculation unit 160. The viewer position information acquisition unit 120 includes a facial recognition unit 121 that recognizes a viewer face from data captured by a camera 200 and a viewer position calculation unit 122 that calculates a position and a distance of a viewer based on a recognition result of the facial recognition unit 121.

With use of the camera 200 that captures the image of a viewer of the autostereoscopic display 100a, the facial recognition unit 121 recognizes the face of the viewer from data captured by the camera 200. Face detection technology is existing technology which is applied to some commercially available digital still camera having a function of detecting and focusing a face. Further, face recognition technology that identifies a captured face by comparison with a template is also existing technology. In the embodiments described hereinbelow, such known face recognition technology may be used. Note that face recognition control can be made using a CPU and software.

The camera 200 is placed at the position where the face of a viewer of the display 100a is easily detectable. For example, the camera 200 is placed at the center of the upper or lower part of a video display area of the autostereoscopic display 100a and captures an image in the direction where a viewer exists. The camera 200 may have specifications capable of capturing moving images such as a web camera (e.g. with resolution of 800×600, 30 fps). The imaging angle of view is preferably wide so as to cover the viewing zone. Some commercially available web cameras have the angle of view of about 80°. Note that, although two or more cameras are generally necessary for distance measurement, it is possible to acquire distance information with one camera by use of object recognition technology.

In this manner, the facial recognition unit 121 detects the direction where each viewer exists based on image data captured by the camera 200 using the face detection function. The viewer position calculation unit 122 calculates the position and the distance of the viewer based on the face of the viewer recognized by the facial recognition unit 121. For example, the viewer position calculation unit 122 measures the distance from the camera 200 to the viewer based on the direction of each viewer from the camera 200 which is detected by the face detection function of the facial recognition unit 121. The viewer position information acquisition unit 120 thereby detects position information of the viewer by the face recognition of the viewer and specifies the position of the viewer in a viewing environment. As a method of measuring the distance performed by the viewer position calculation unit 122, there are broadly two ways below.

<Distance Measurement Method 1>

A viewer moves to a predetermined position (e.g. a position 2 m away from the center of the screen) and captures his/her face at the position using the camera. The size of a face image captured at this time is used as a reference. The capture of a reference image is processed as initial setting before content viewing. Specifically, the viewer position calculation unit 122 obtains an average size of a face on an image with respect to visual distance in advance and records it into a database or memory, which is not shown. By comparing the size of the detected face image of the viewer with the data in the database or memory and reading out the corresponding distance data, position information of the viewer and distance information from the display 100a to the viewer can be acquired. Because the position of the camera 200 is fixed, relative position information of the viewer relative to the display 100a may be also acquired from coordinates information on the image where the detected face is located. Note that such processing may be performed also when a plurality of viewers exist. Further, the database or memory may be included in the stereoscopic display device 100 or stored externally.

<Distance Measurement Method 2>

The left and right eyes of the viewer are detectable by the facial recognition unit 121. The distance of the centers of mass of the left and right eyes which are captured by the camera 200 is calculated. The autostereoscopic display in general has a design visual distance. Further, the pupillary distance (interocular distance) of a person is 65 mm in average. Using the case where a viewer with the pupillary distance of 65 mm is away from the camera 200 by the design visual distance as a standard, the distance from the calculated distance of the centers of mass of the left and right eyes to the viewer is calculated at the time of face recognition by the facial recognition unit 121.

Although a distance shorter than an actual distance is calculated when performing face recognition of a person with the pupillary distance of longer than 65 mm, for example, the autostereoscopic display device 100 according to the embodiment is optically designed on the assumption of a given pupillary distance and thus no problem is caused. Therefore, by the facial recognition unit 121 and the distance measurement method described above, the position of the viewer in the viewing space can be calculated.

The multi-view image processing unit 130 inputs or generates multi-view images with two or more views. In the case of FIG. 17, images with four views are processed. In the autostereoscopic display device 100 according to the embodiment, images of the number of display views may be directly input, or images of less than the number of display views may be input and then new display view images may be generated in the multi-view image processing unit 130.

The multi-view image output unit 140 receives a control signal from the multi-view image control unit 170 and outputs multi-view images to the stereoscopic display 100a. Under control of the multi-view image control unit 170, the multi-view image output unit 140 performs switching of view images and outputs the images to the stereoscopic display 100a. Note that the control by the multi-view image control unit 170 is described in detail later.

When the "viewing zone" in a general 2D display device is a zone where an image displayed on the display is normally viewable, the "viewing zone" in the autostereoscopic display device is a desired zone (orthoscopic zone) where an image displayed on the autostereoscopic display 100a is normally viewable as a stereoscopic image. The viewing zone is determined by a plurality of factors such as a design value of the autostereoscopic display device or a video content. Further, the pseudoscopic phenomenon specific to the autostereoscopic display exists as described above, and pseudoscopy is observed depending on the viewing position. The zone where pseudoscopy is observed is referred to as the pseudoscopic zone, on the contrary to the viewing zone (orthoscopic zone).

Because pseudoscopy is the state where a video to be enter the left eye enters the right eye and a video to be enter the right eye enters the left eye as described above, a disparity which is reverse to a disparity intended for the content is input to the eyes of the viewer. Further, as the number of views to be displayed on the stereoscopic display 100a is larger, the disparity value during observation of pseudoscopy increases compared to the case when normally observing stereoscopy, thus producing an extremely uncomfortable image. Therefore, it is not preferable that a viewer observes pseudoscopy.

Figure 3:
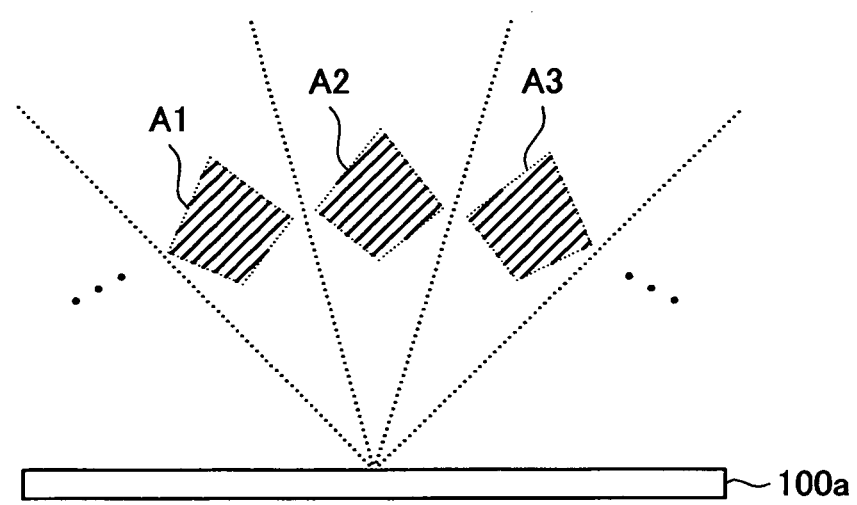
FIG. 3 is a view showing a relationship between a viewing zone and a periodicity of views according to the first to fifth embodiments.

As described above, the autostereoscopic display device using the parallax element has a design visual distance. For example, when the design visual distance is 2 m, a zone where a stereoscopic video is viewable exists about 2 m away from the display in the horizontal direction. However, a zone where pseudoscopy is observed exists at certain intervals in the horizontal direction. This is the phenomenon which occurs in principle in the autostereoscopic display device using the parallax element. In the case of displaying an image having a disparity all over the screen, at least one place where it looks pseudoscopic occurs inevitably on the screen when getting closer or farther than the design visual distance. On the other hand, in the case of displaying an image having a disparity only near the center of the screen, the pseudoscopic zone exists at certain intervals just like around the design visual distance even when getting closer or farther than the design visual distance. FIG. 3 shows an example of the viewing zone. As described above, a plurality of view images are arranged periodically at the respective pixels of the stereoscopic display 100a. The area near the boundary of the periods is the pseudoscopic zone, and the viewing zones A1, A2, A3, . . . exist in each period between the boundaries of the periods. The viewing zone in the viewing space as illustrated in FIG. 3 is calculated by the viewing zone calculation unit 150 based on optical design conditions or the like.

Figure 4:
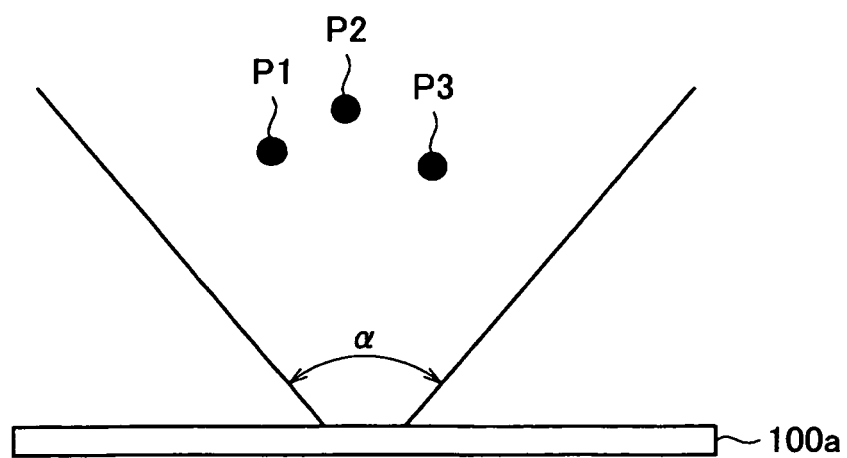
FIG. 4 is a view showing an example of a viewer position detection result.

The target viewing zone calculation unit 160 calculates a target viewing zone using the position information of a viewer calculated by the viewer position information acquisition unit 120 and the viewing zone calculated by the viewing zone calculation unit 150. As described above, the position information about the position where a viewer exists in the viewing space can be detected by the viewer position information acquisition unit 120. Further, the viewing zone in the viewing space is calculated by the viewing zone calculation unit 150 based on desired conditions. FIG. 4 shows a detection result of viewer positions by the processing of the viewer position information acquisition unit 120. "α" in FIG. 4 indicates the angle of the camera 200, and the position where a viewer exists in the range of the angle α (positions P1, P2 and P3 where viewers exist in FIG. 4) can be detected. The description below is provided using the viewing zones A1, A2, . . . shown in FIG. 3 as the zones calculated by the viewing zone calculation unit 150.

Figure 5:
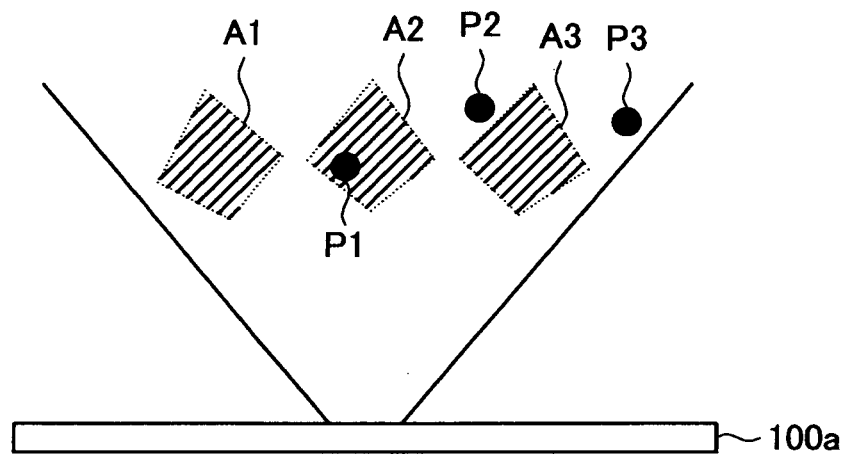
FIG. 5 is a view to explain a positional relationship between a viewing zone and a viewer.

The target viewing zone calculation unit 160 aligns the coordinate axis of the viewing zones A1, A2 and A3 shown in FIG. 3 with the coordinate axis of the positions P1, P2 and P3 shown in FIG. 4 to thereby figure out the position relationship between the viewing zones A1, A2 and A3 and the viewers P1, P2 and P3 as shown in FIG. 5. The target viewing zone calculation unit 160 counts the number of viewers existing outside the viewing zone. As a result, when one or more viewers exist outside the viewing zone, the target viewing zone calculation unit 160 rotates the viewing zone by a given angle each time with respect to the center of the screen and counts the number of viewers existing in the viewing zone in each rotation.

The angle of rotation may be an angle corresponding to the interval from pseudoscopy to pseudoscopy (between the boundaries of the period) with the center of the screen as a point of view. For example, when the design visual distance is 2 m, the view intervals in the design visual distance is 65 mm, and the number of views is nine, the angle of rotation is about 16°. The target viewing zone calculation unit 160 rotates the angle by 16° each, and sets the viewing zone where the number of viewers existing inside the viewing zone is greatest as the target viewing zone.

Figure 6:
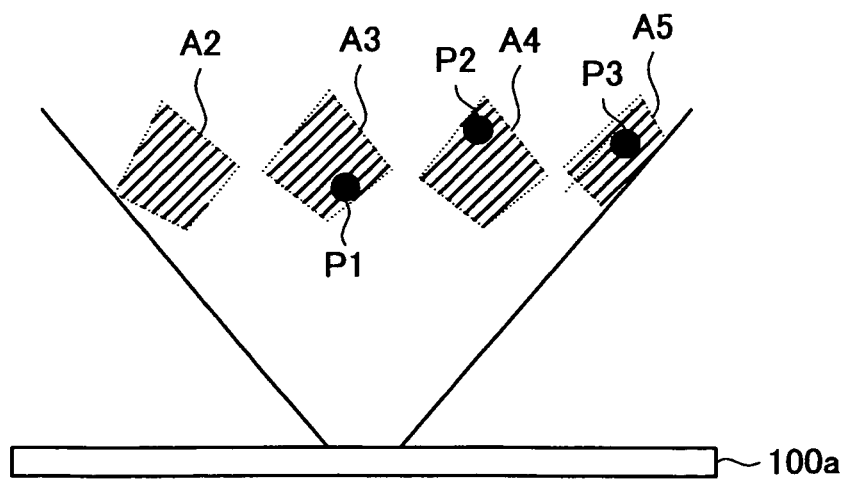
FIG. 6 is a view to explain a positional relationship between a viewing zone and a viewer after the viewing zone is rotated.

For example, in the state of FIG. 5, only one viewer P1, out of three viewers in total (P1, P2 and P3), exists inside the viewing zone A2. Then, the viewing zone is rotated by 16° each with respect to the center of the screen, so that the three viewers P1, P2 and P3 can exist inside the viewing zones A3 to A5, respectively, as shown in FIG. 6.

Figure 7:
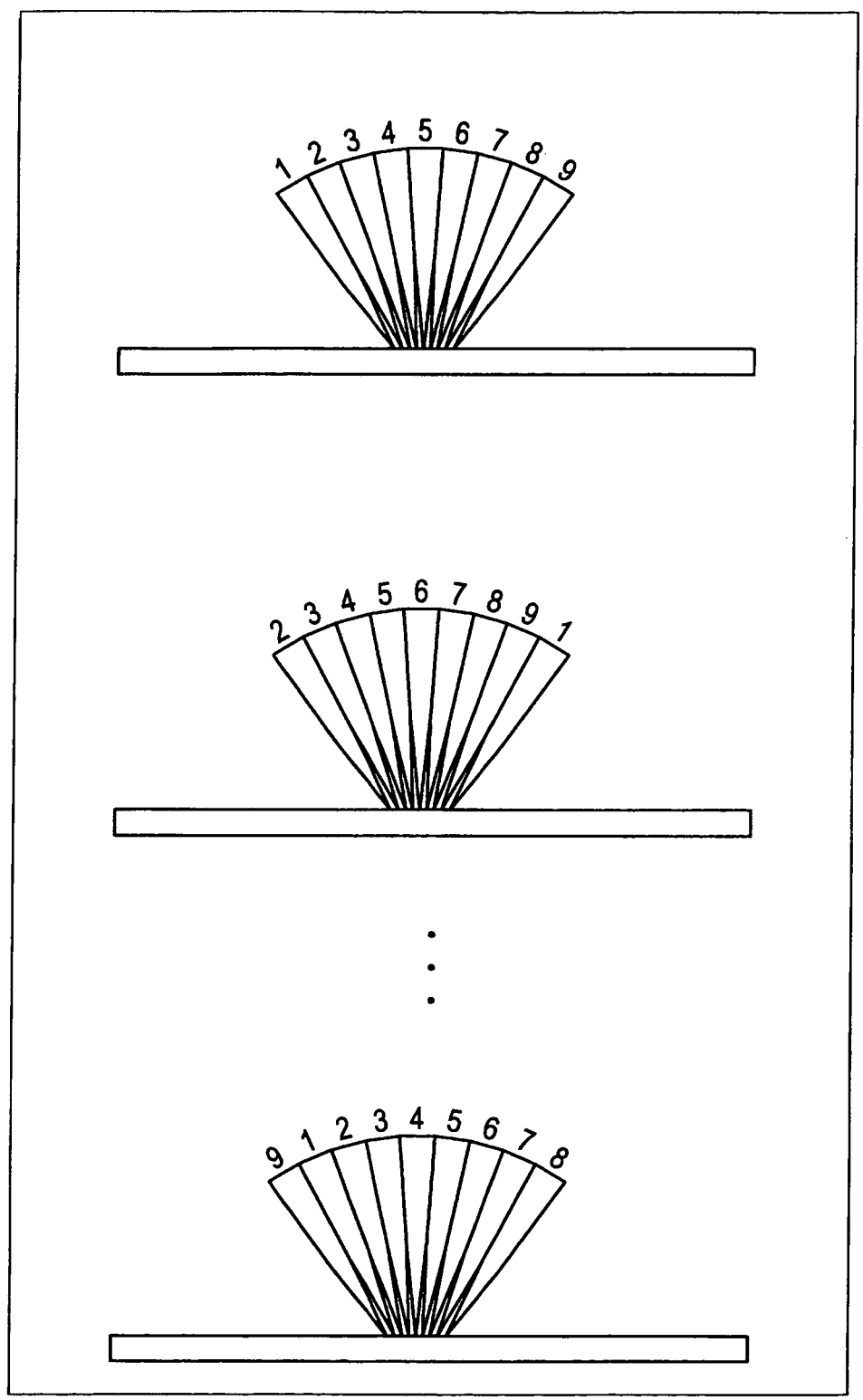
FIG. 7 is a view to explain a change in display of a view image due to switching of a display image.

In this example, FIG. 3 is the initial state of the view image which is output near the center of the screen. The allocation of view images is determined by image mapping onto the parallax element (parallax barrier 110) and the display device (stereoscopic display 100a) in FIG. 2. In the image mapping, a display position in the display device (stereoscopic display 100a) is determined for each view. Thus, in the mapping onto the stereoscopic display 100a, display of a view image can be varied by switching a display image. In the case of nine views, nine patterns of display are possible. In other words, display methods of the number of views exist. The multi-view image control unit 170 compares the viewing zone when making display of the number of views with the target viewing zone and selects the display most similar to the target viewing zone. In FIG. 7, the multi-view image control unit 170 compares the viewing zone when making nine patterns of display with the target viewing zone and selects the display of the view image in the viewing zone having the position relationship most similar to that of the target viewing zone. Although it is most preferred that the multi-view image control unit 170 selects the display of the view image in the viewing zone having the position relationship most similar to that of the target viewing zone, the position relationship may not be most similar as long as it selects the display of the view image in the viewing zone having the position relationship similar to that of the target viewing zone. The selection result is notified to the multi-view image output unit 140. The multi-view image output unit 140 outputs the selected display of the view image to the stereoscopic display 100a. This processing maximizes the number of viewers in the viewing zone, thereby offering a comfortable viewing environment of stereoscopic videos to a user.

[Operation of Stereoscopic Display Device]

Figure 8:
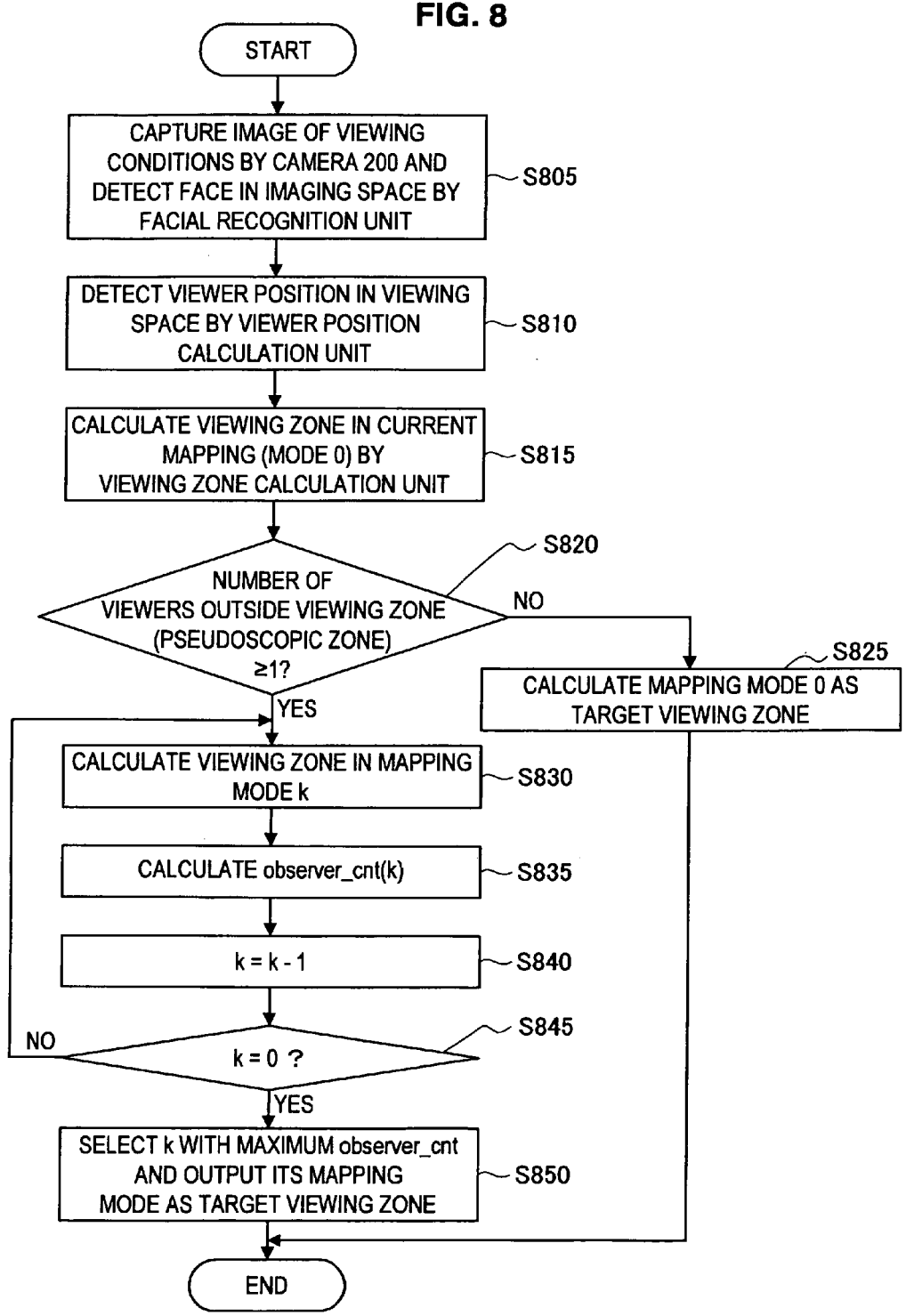
FIG. 8 is a view showing a process flow of the stereoscopic display device according to the first embodiment.

The overall operation of the stereoscopic display device according to the embodiment is described hereinafter with reference to the process flow of FIG. 8. Referring to FIG. 8, when the process is started, the camera 200 captures the image of the viewing environment, and the facial recognition unit 121 detects a face in the captured space (S805).

Next, the viewer position calculation unit 122 detects the position of the viewer in the viewing space (S810). Then, the viewing zone calculation unit 150 calculates the viewing zone in the mapping (mode 0) at the point of time (S815).

Then, the target viewing zone calculation unit 160 determines whether the number of viewers outside the viewing zone (in the pseudoscopic zone) is one or more (S820). When the number of viewers outside the viewing zone (in the pseudoscopic zone) is less than one, there is no need to switch the view image, and sets the mapping mode 0 as the target viewing zone (S825).

On the other hand, when the number of viewers outside the viewing zone (in the pseudoscopic zone) is one or more, the target viewing zone calculation unit 160 calculates the viewing zone in the mapping mode k (S830). When the number of views is nine, the initial value of the mapping mode k is nine. Then, the target viewing zone calculation unit 160 counts the number of viewers (observer_cnt(k)) in the viewing zone in the mapping mode k (S835). Further, the target viewing zone calculation unit 160 subtracts one from the value of the mapping mode k (S840) and determines whether the mapping mode k is zero or not (S845).

When the value of k is not zero, the target viewing zone calculation unit 160 repeats the processing of S830 to S845. On the other hand, when the value of k is zero, the target viewing zone calculation unit 160 selects the mapping mode k with the maximum number of viewers (observer_cnt(k)) and outputs the mapping mode k as the target viewing zone (S850).

Although not shown in the process flow, according to the mapping mode k output as the target viewing zone, the multi-view image control unit 170 compares the viewing zone when displaying the images of the number of views generated by the multi-view image processing unit 130 with the target viewing zone and selects the display of the view image most similar to the target viewing zone. The multi-view image output unit 140 displays the selected view image to the stereoscopic display 100a.

As described above, the stereoscopic display device 100 according to the embodiment enables control of the viewing zone so that a viewer can easily view images in accordance with the position of the viewer without the need to increase the accuracy level of viewer position detection or optical control of the parallax element. It is thereby possible to offer a comfortable viewing environment of stereoscopic videos to the user in a simple and easy way without the need for the user to move the viewing position.

Second Embodiment

A second embodiment of the present disclosure is described hereinbelow. In the second embodiment, the viewing zone is controlled according to the position of a viewer in consideration of the priority of the viewer based on attribute information. Hereinafter, the stereoscopic display device according to the embodiment is described in detail.

[Functional Structure of Stereoscopic Display Device]

Figure 9:
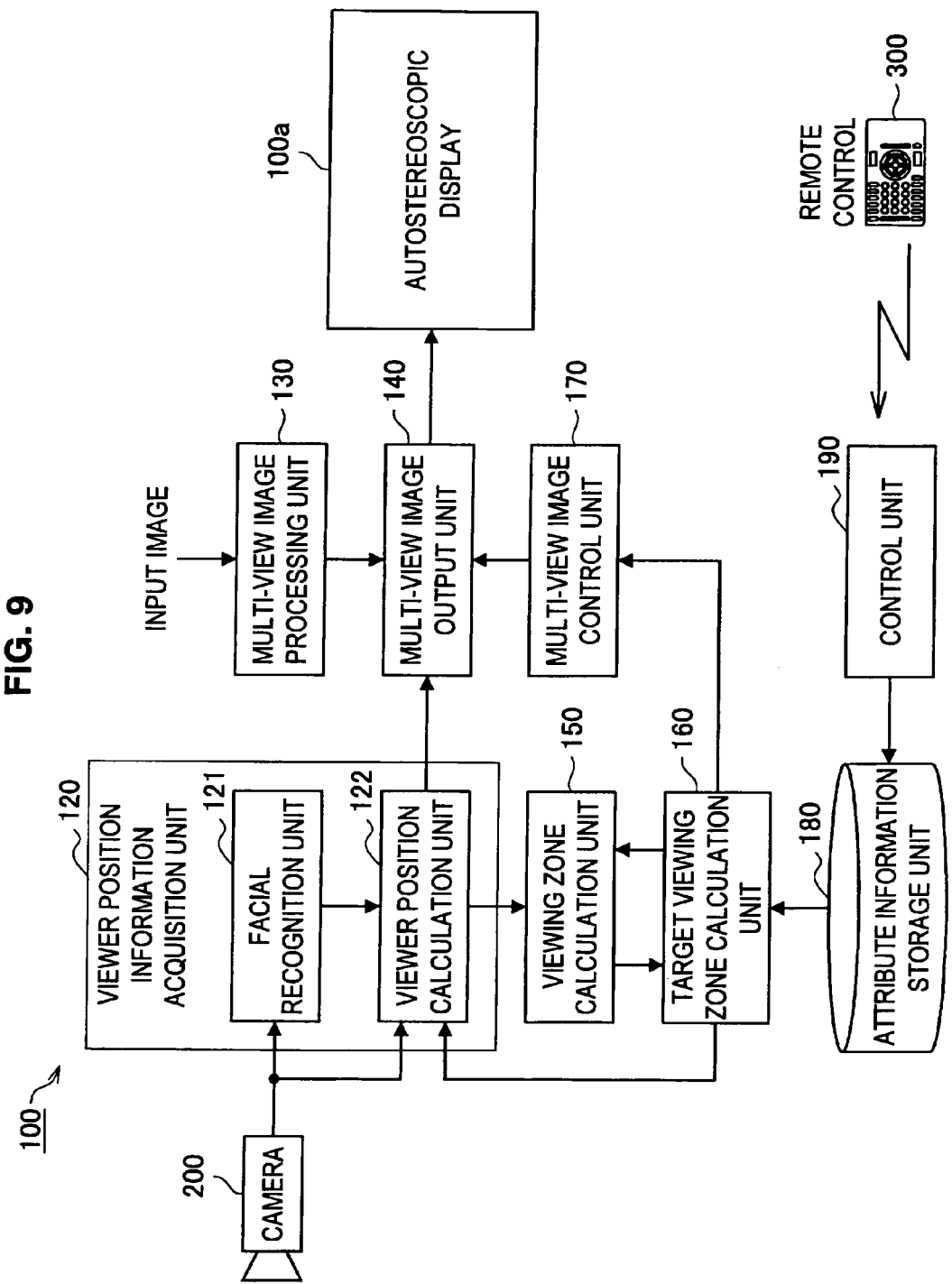
FIG. 9 is a functional block diagram of a stereoscopic display device according to second to fourth embodiments of the present disclosure.

As shown in FIG. 9, the functional structure of the stereoscopic display device 100 according to this embodiment is basically the same as the functional structure of the stereoscopic display device 100 according to the first embodiment. Therefore, redundant explanation is not repeated, and an attribute information storage unit 180 and a control unit 190, which are added to the functional structure of the stereoscopic display device 100 according to the first embodiment, are described hereinbelow.

According to this embodiment, the attribute information storage unit 180 stores attribute information. The control unit 190 registers attribute information of a viewer into the attribute information storage unit 180 before viewing of stereoscopic videos in response to a command from the viewer by remote control operation or the like. Specifically, the control unit 190 leads a viewer to move to the position where the camera 200 can capture the image of the viewer, and controls the facial recognition unit 121 to perform face recognition through the viewer's operation of the remote control 300 or the like. Next, the control unit 190 associates a recognition result by the facial recognition unit 121 with an identifier. For example, the control unit 190 may prompt a viewer to input the viewer's name as the identifier of the viewer through the remote control 300 or the like. In the case of registering a plurality of viewers, the priority is registered in addition.

For example, it is assumed that, as a result of the face recognition, faces of three persons, a father, a mother and a child, are recognized. In this case, the control unit 190 associates face recognition information of the father with his name and priority and registers them into the attribute information storage unit 180. The name and the priority of a viewer are examples of the attribute information of the viewer. The attribute information for the mother and the child are also stored into the attribute information storage unit 180 in advance in the same manner.

The registration into the attribute information storage unit 180 is made by each user one by one interactively through remote control or the like according to a guide or the like displayed on the screen. After the registration, the face of a viewer, i.e. a person, recognized by the facial recognition unit 121 and the attribute information such as a name or a priority may be associated.

In this embodiment, the target viewing zone calculation unit 160 calculates the target viewing zone on condition that a viewer with a high priority exists in the viewing zone as much as possible. For example, three levels of priority may be set. The priority may be scored among 3: high priority, 2: medium priority, and 1: low priority, and stored into the attribute information storage unit 180.

The attribute information is notified to the target viewing zone calculation unit 160. The target viewing zone calculation unit 160 counts the score of the priority of each viewer in the viewing zone and determines the viewing zone with the highest total score as the target viewing zone, instead of counting the number of viewers in the viewing zone as performed in the first embodiment.

[Operation of Stereoscopic Display Device]

Figure 10:
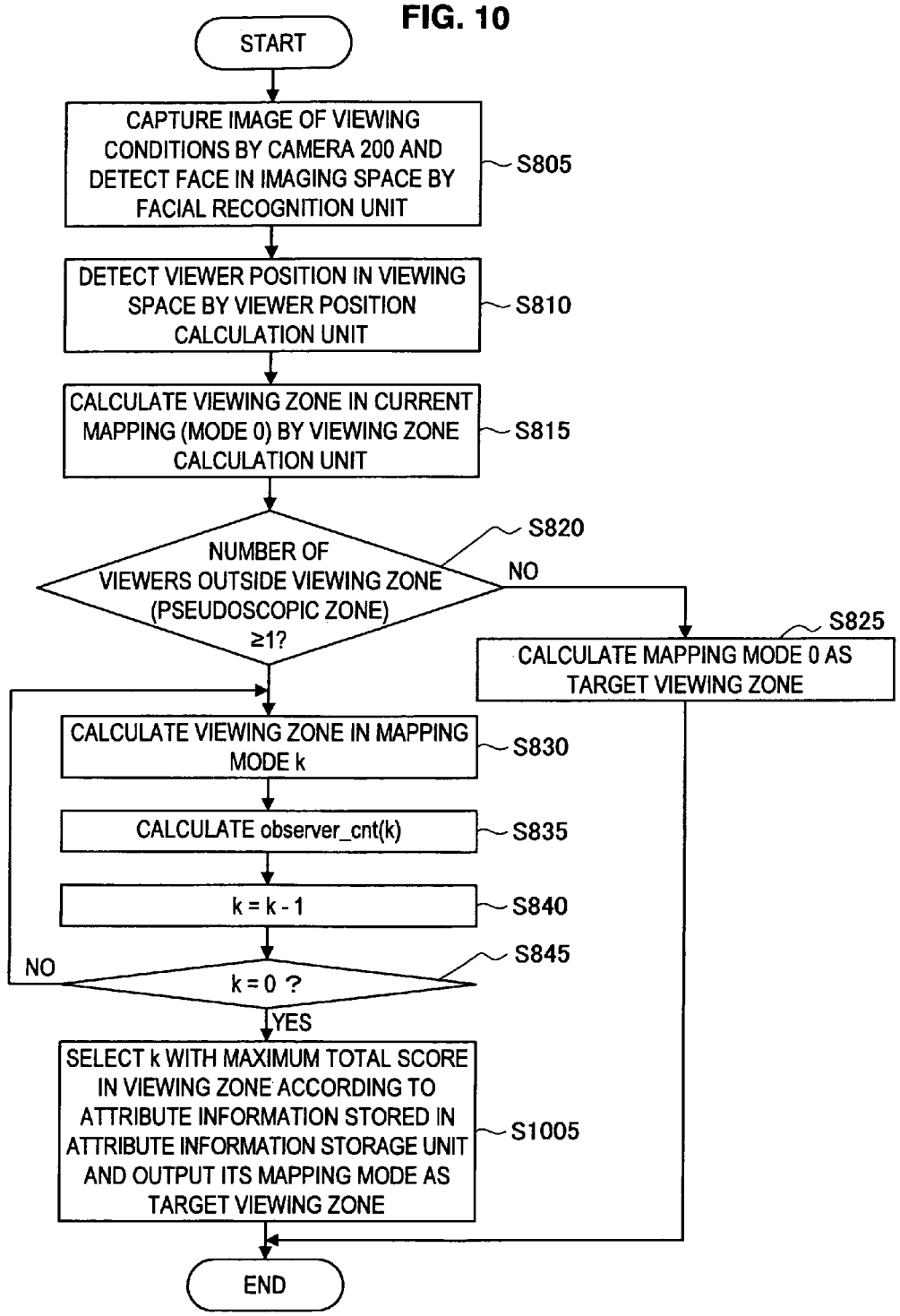
FIG. 10 is a view showing a process flow of the stereoscopic display device according to the second embodiment.

The overall operation of the stereoscopic display device according to the embodiment is described hereinafter with reference to the process flow of FIG. 10. Referring to FIG. 10, when the process is started, processing of S805 to S845 is performed in the same manner as that in the process flow according to the first embodiment. After repeating the processing of S805 to S845, when the value of k is zero in S845, the target viewing zone calculation unit 160 selects the mapping mode k with the highest total score of the priority of viewers in the viewing zone which is stored in the attribute information storage unit 180 according to the attribute information in the attribute information storage unit 180, and outputs the mapping mode k as the target viewing zone (S1005). When the priority among the attribute information is stored as scores in the attribute information storage unit 180, for example, stereoscopic videos can be displayed in the viewing zone where the priority is taken into consideration.

As described above, the stereoscopic display device 100 according to the embodiment enables control of the viewing zone so that a viewer with a higher priority, for example, can easily view images in accordance with the attribute information of the viewer. It is thereby possible to offer a comfortable viewing environment of stereoscopic videos to the user in a simple and easy way without the need for the user to move the viewing position.

Third Embodiment

A third embodiment of the present disclosure is described hereinbelow. In the third embodiment, the priority is not registered in advance as in the second embodiment, and the priority of a particular viewer is temporarily set high by a user's remote control operation, so that the particular viewer comes inside the viewing zone in a mandatory manner. Hereinafter, the stereoscopic display device according to the embodiment is described in detail. Note that the functional structure of the stereoscopic display device 100 according to this embodiment is the same as that according to the second embodiment shown in FIG. 9, and thus not redundantly described.

[Operation of Stereoscopic Display Device]

Figure 11:
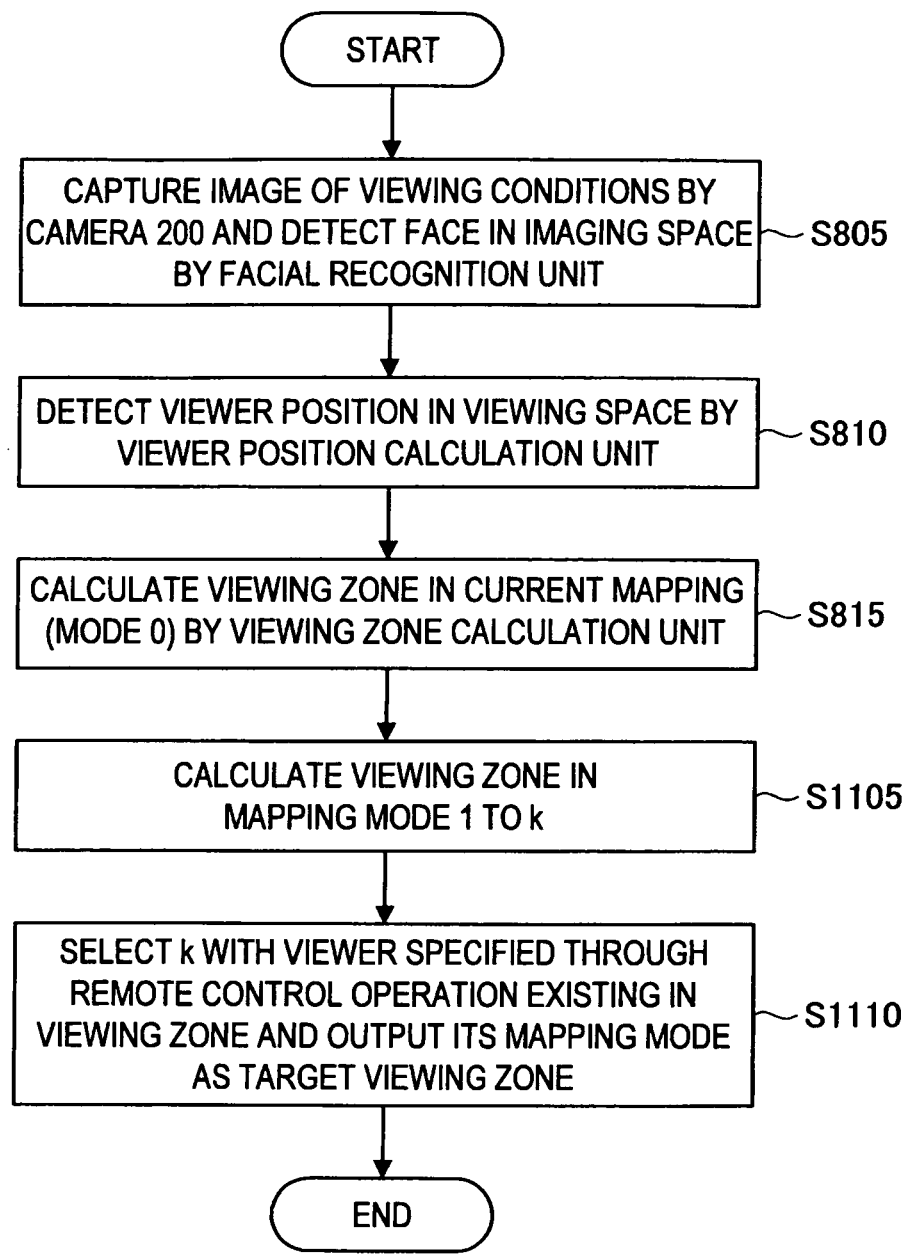
FIG. 11 is a view showing a process flow of the stereoscopic display device according to the third embodiment.

The overall operation of the stereoscopic display device according to the embodiment is described hereinafter with reference to the process flow of FIG. 11. Referring to FIG. 11, when the process is started, processing of S805 to S815 is performed in the same manner as in the process flow according to the first embodiment.

Next, the viewing zone calculation unit 150 calculates the viewing zone in the mapping modes 1 to k (S1105). Then, in the state where face recognition of a viewer in the viewing environment by the facial recognition unit 121 is completed, the target viewing zone calculation unit 160 calls for a viewer detection screen in the viewing environment by a viewer's remote control operation. The viewer designates a particular position in the viewer detection screen through the remote control operation. When designating said person holding the remote control, the place where the person is located is designated by a cursor or the like. The target viewing zone calculation unit 160 then calculates the target viewing zone so that the designated place comes inside the viewing zone. Note that one or a plurality of places may be designated. Further, the designated place is an example of the attribute information designated by the viewer's remote control operation, and the attribute information to be designated may be not only the position but also the gender of either female or male, the age of either child or adult or the like.

As described above, the stereoscopic display device 100 according to the embodiment enables control so that a place designated by a user through remote control or the like comes inside the viewing zone.

Fourth Embodiment

A second embodiment of the present disclosure is described hereinbelow. Note that the functional structure of the stereoscopic display device 100 according to this embodiment is the same as that according to the second embodiment shown in FIG. 9, and thus not redundantly described.

[Operation of Stereoscopic Display Device]

Figure 12:
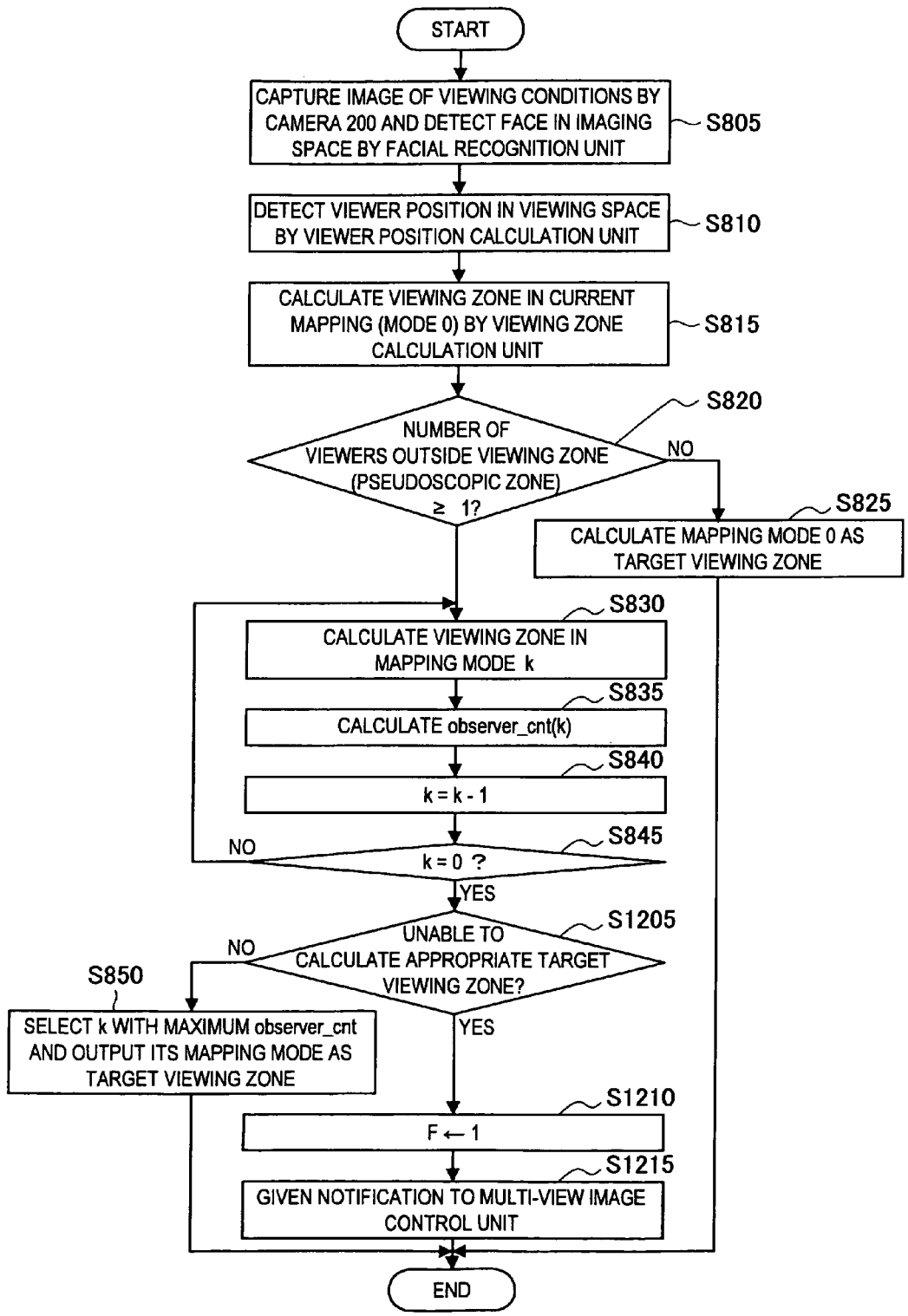
FIG. 12 is a view showing a process flow of the stereoscopic display device according to the fourth embodiment.

The overall operation of the stereoscopic display device according to the embodiment is described hereinafter with reference to the process flow of FIG. 12. Referring to FIG. 12, when the process is started, processing of S805 to S845 is performed in the same manner as in the process flow according to the first embodiment.

In the fourth embodiment, when the mapping mode k is determined to be zero in S845, the process proceeds to S1205, and the target viewing zone calculation unit 160 determines whether it is able to calculate an appropriate target viewing zone (S1205). When it is determined that calculation of an appropriate target viewing zone is not possible, the target viewing zone calculation unit 160 set a flag by substituting one to a flag F indicating that (S1210), and notifies that to the multi-view image control unit 170 (S1215). Note that, receiving the notification, the multi-view image output unit 140 may cancel the display of stereoscopic images or make 2D display of images on the display. Then, a viewer can view 2D videos even in the environment where 3D videos are not viewable.

On the other hand, when it is determined in S1205 that calculation of an appropriate target viewing zone is possible, the target viewing zone calculation unit 160 selects the mapping mode k with the maximum number of viewers (observer_cnt(k)) and outputs the mapping mode k as the target viewing zone (S850), just like the case of the first embodiment.

As described above, the stereoscopic display device 100 according to the embodiment enables control of the viewing zone so that a viewer can easily view images in accordance with the position of the viewer, in the same manner as in the first embodiment. Therefore, a user can comfortably view 3D videos without moving. The process "when the appropriate target viewing zone could not be calculated", which has been described in this embodiment, may be applied to the first to third embodiments.

An example of the case where it is unable to calculate the target viewing zone is when the number of viewers is large and it is determined that it is unable to provide a comfortable 3D environment with any setting of view images, such as the case where "the number of viewers existing in the pseudoscopic zone is always two or more".

Note that, in this embodiment, the threshold such as "two or more" described above as the condition to fail to provide a comfortable 3D environment may be set by a user. Further, switching of mode such as whether control is made so that "the number of viewers in the viewing zone is maximum" as described in the first embodiment or the priority is placed on the criterion as described in this embodiment may be also set by a user.

Fifth Embodiment

The first to fourth embodiments described above place focus on how to make a control to avoid pseudoscopy effectively on the side of the stereoscopic display device, and a viewer does not move. On contrast therewith, this embodiment is based on the assumption that it is difficult to ultimately solve the problem of the pseudoscopy because the pseudoscopy occurs in principle in the autostereoscopic display device 100. Based on this assumption, in this embodiment, information for prompting the viewer to move to the orthoscopic zone is displayed, thereby actively causing the viewer to move to the orthoscopic zone. This embodiment is therefore different from the first to fourth embodiments in this respect.

[Functional Structure of Stereoscopic Display Device]

Figure 13:
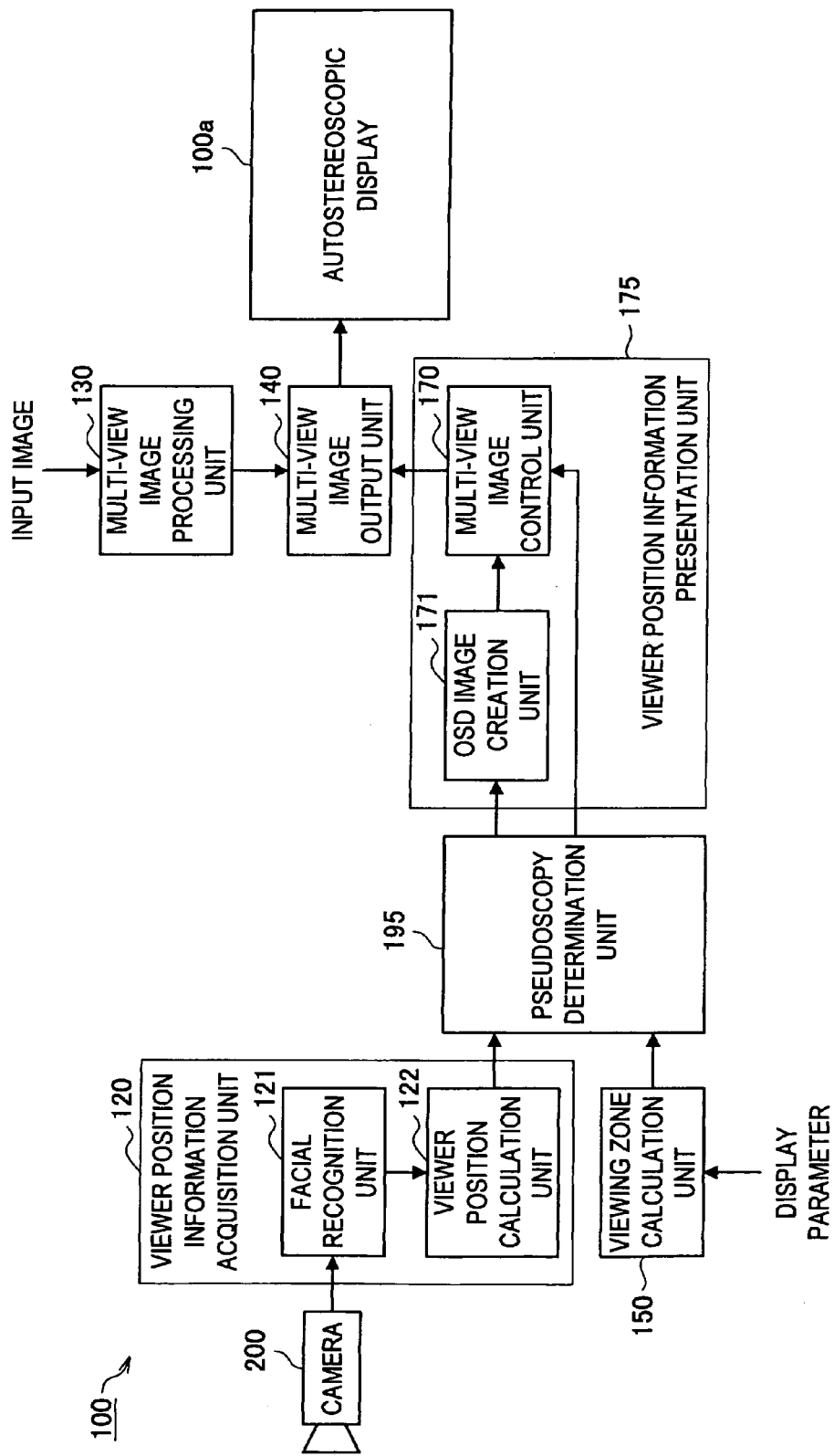
FIG. 13 is a functional block diagram of a stereoscopic display device according to a fifth embodiment.

As shown in FIG. 13, the functional structure of the stereoscopic display device 100 according to this embodiment is basically the same as the functional structure of the stereoscopic display device 100 according to the first embodiment. In addition, the stereoscopic display device 100 according to this embodiment further has functions of an OSD image creation unit 171 and a pseudoscopy determination unit 195. The multi-view image control unit 170 and the OSD image creation unit 171 are included in a viewer position information presentation unit 175, and present position information that prompts a viewer to move to the orthoscopic zone as on-screen display (OSD) on the autostereoscopic display.

The viewer position information presentation unit 175 controls the multi-view image control unit 170 so as to superpose an OSD image created in the OSD image creation unit 171 upon a multi-view image and arrange the same pixels of the OSD image in the same pixel positions of the respective views in the autostereoscopic display 100a with multiple views. Consequently, a 2D image which is created by displaying the same pixel in the same position when viewed from any point of view is displayed in a 2D display area placed in a part of the stereoscopic display 100a. The display 100a can be thereby used as a means of presenting a 2D image for guiding a viewer to a comfortable 3D viewing position. The OSD image is an example of the guiding information for guiding a viewer to the viewing zone.

Note that, as described above, the viewing zone calculation unit 150 calculates the viewing zone which is position information where comfortable viewing is possible based on a design value of the autostereoscopic display device 100, a multi-view image output state or the like. The pseudoscopy determination unit 195 determines whether a viewer is in the pseudoscopic position or the orthoscopic position based on the calculated viewing zone and the position information of the viewer. Then, the viewing zone (orthoscopic zone) which is position information where comfortable viewing is possible and the position information of the viewer are both displayed on the stereoscopic display 100a. By presenting the information for guiding a viewer to the orthoscopic zone in this manner, the user can easily move to a comfortable viewing position. Considering that the guiding information is originally information for a viewer existing inside the pseudoscopic zone, display of a stereoscopic video in the pseudoscopic zone is unclear and causes a feeling of discomfort. For this reason, the presentation of the guiding information is displayed in the 2D display area of the stereoscopic display 100a.

The multi-view image processing unit 130 may have a function of generating a multi-view image for autostereoscopic image display from a right-eye image (L image) and a left-eye image (R image); however, it is not limited thereto, and it may have a function of inputting a multi-view image for autostereoscopic image display.

The viewer position information acquisition unit 120 includes the facial recognition unit 121 that recognizes the face of a viewer from the camera 200 and the data captured by the camera 200, and the viewer position calculation unit 122. In the multi-view autostereoscopic display device, the viewing zone where orthoscopic viewing is possible expands according to the number of views. Therefore, the viewer position information acquisition unit 120 may use information containing some errors such as face recognition by the camera 200 and the captured data of the camera 200. Further, the viewer position information acquisition unit 120 can acquire the position of a viewer viewing the stereoscopic display 100a and the distance information of a viewer with respect to the stereoscopic display 100a by image processing.

Display Screen Example

Figure 14:
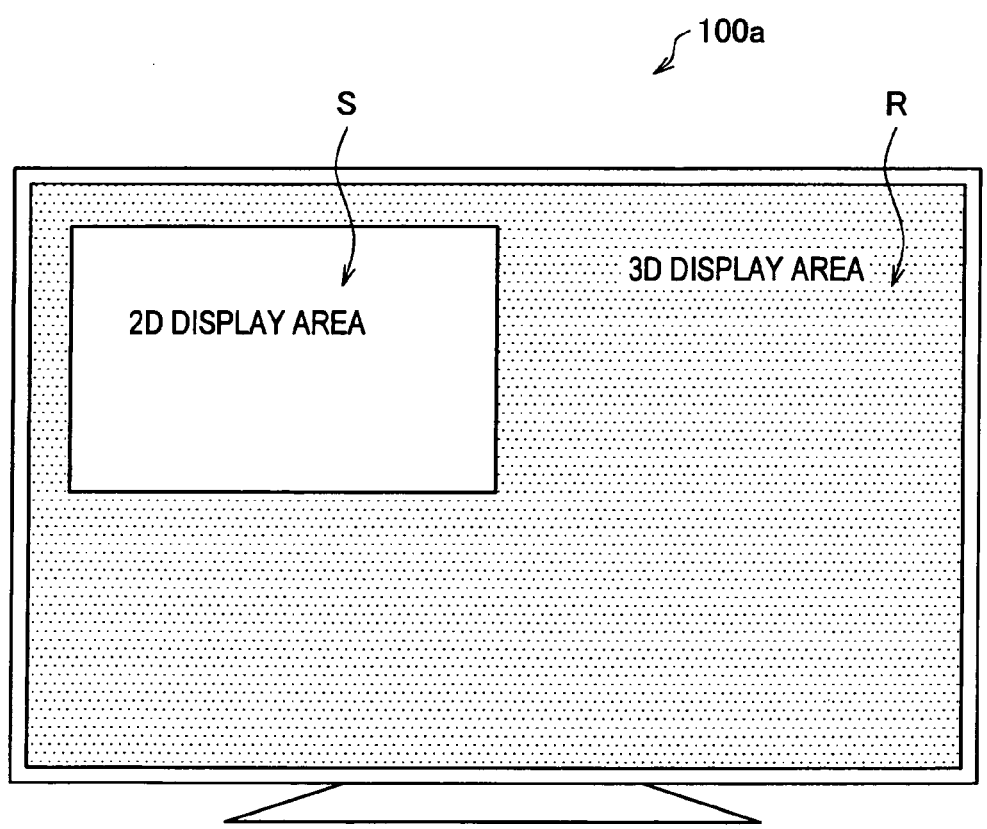
FIG. 14 is a schematic view showing a 2D display area on a stereoscopic display according to the fifth embodiment.

FIG. 14 shows a schematic view of a 2D display area displayed on the screen of the stereoscopic display 100a of the autostereoscopic display device. In this example, the stereoscopic display 100a has a 2D display area (S) within a 3D display area (R). In this structure, even in the stereoscopic display 100a with multiple views, a 2D image can be presented without the occurrence of pseudoscopic phenomenon in principle by inserting the same image to the same position of each view image. Therefore, even when a viewer is in the pseudoscopic position, if the position information is presented in the 2D display area (S), the viewer can easily read the information on the display. As a display method, the position information for guiding a viewer to the orthoscopic position may be displayed as 2D in a part of the display plane as shown in FIG. 14, or displayed as 2D all over the screen. Further, for example, it is feasible that the position information is not displayed as 2D during viewing of a 3D content, and the position information is displayed as 2D when playback of the 3D content is paused or before start of content viewing.

A method of displaying a 2D image in the 3D display area (R) of the stereoscopic display 100a is described hereinbelow. When the parallax barrier does not have on/off function, the guiding information may be displayed as 2D on the 3D screen by displaying the same image at the same position of each view image. When the parallax barrier has on/off function (i.e. in the case of a liquid crystal barrier), when the barrier function is turned off by setting light transmission mode using a function of turning on/off light transmission, the display 100a can be used as a 2D display screen with high resolution. When the barrier function of the liquid crystal barrier is on, the guiding information may be displayed as 2D on the 3D screen by displaying the same image at the same position of each view image, just like in the case of the fixed barrier. In the case of the lenticular lens as well, a fixed lens and a variable liquid crystal lens may be used, and the guiding information can be displayed as 2D by the same control as in the case of the barrier. Note that the OSD image may be output as a 3D image in the 3D display area (R).

[Operation of Stereoscopic Display Device]

Figure 15:
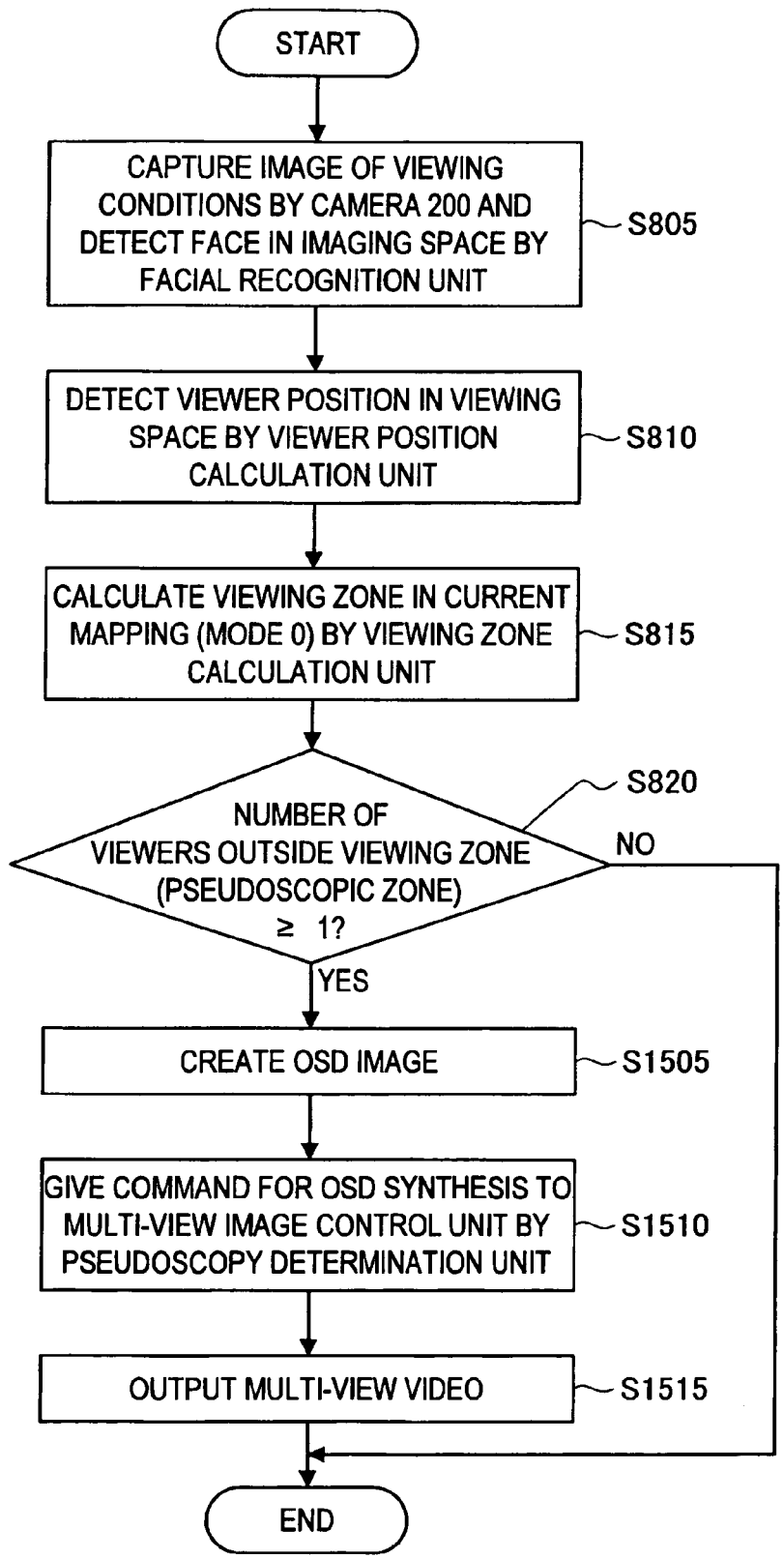
FIG. 15 is a view showing a process flow of the stereoscopic display device according to the fifth embodiment.

The overall operation of the stereoscopic display device according to the embodiment is described hereinafter with reference to the process flow of FIG. 15. Referring to FIG. 15, when the process is started, processing of S805 to S820 is performed in the same manner as in the process flow according to the first embodiment.

Specifically, the camera 200 captures the image of the viewing environment, and the facial recognition unit 121 detects a face in the captured space from the captured data (S805). Based on the face detection result, the viewer position calculation unit 122 calculates viewer position information (S810), and the viewing zone calculation unit 150 calculates viewing zone information in the current mapping at the current point of time (S815). Based on the viewer position information and the viewing zone information calculated in S810 and S815, the pseudoscopy determination unit 195 makes determination about pseudoscopy (S820). As a result of the pseudoscopy determination, when the number of pseudoscopic viewers is less than one (S820), an OSD image is not created, and an instruction for synthesis is not made. Because all viewers are viewing in the orthoscopic zone in this case, it is determined not to perform guiding display, and the process thereby ends.

On the other hand, as a result of the pseudoscopy determination, when the number of pseudoscopic viewers is one or more (S820), the pseudoscopy determination unit 195 directs the OSD image creation unit 171 to create an image for prompting a viewer to move to the orthoscopic position (S1505), and gives a command (OSD synthesis command) for inserting the OSD image into the multi-view image to the multi-view image control unit 170 in order display the OSD image (S1510). The OSD image for guiding a viewer to the orthoscopic zone is thereby displayed as a 2D image on the stereoscopic display 100a (S1515).

Note that the OSD image is displayed as a 2D image when the number of pseudoscopic viewers is determined to be one or more in S820 in the above-described process flow, the OSD image may be displayed as a 2D image for confirmation even when the number of viewers outside the viewing zone (in the pseudoscopic zone) is determined to be less than one in S820 and all viewers are viewing in the orthoscopic zone.

Display Example 1

FIG. 16A shows an example of the OSD image having guiding information which is displayed as 2D in the 2D display area. For example, in FIG. 16A, the stereoscopic display 100a is presented at the upper part of the screen, and the 2D image is displayed in such a way that the position relationship between the stereoscopic display, the viewing zones A1, A2 and A3, and viewers is seen. Further, the image is displayed in such a way that the viewing zones, pseudoscopic viewers, and orthoscopic viewers are distinguishable. For example, color-coding may be used, such as blue for viewers in the orthoscopic zone, red for viewers in the pseudoscopic zone, and yellow for viewing zones. A determination result of the pseudoscopic viewer and the orthoscopic viewer may be distinguished using different colors.

Furthermore, the 2D image is displayed in such a way that a plurality of viewers displayed are distinguishable. In this example, each user and a mark are associated one to one by face recognition, and the user can easily recognize his/her viewing position. Further, by presenting depth information (distance information from the display 100a) obtained from the viewer position information acquisition unit 120 to a user in addition, the user can an easily recognize the front-to-back and left-to-right position relationship between his/her position and the orthoscopic position. Further, information indicating the moving direction with an arrow or the like may be presented so that each user can easily determine which direction they should move to reach the orthoscopic position as shown in FIG. 16A. Further, in this case, a plurality of users may be prevented from being guided to the same viewing zone at the same time.

Display Example 2

The guiding information displayed on the display to guide a viewer to the orthoscopic position may be displayed as a bird's-eye view illustrating the inside of a room where the display 100a is placed from the top as shown in FIG. 16A, or displayed in a form using the display as a mirror plane as shown in FIGS. 16B and 16C. To indicate the positions of viewers, each viewer may be displayed using a mark, using an avatar created by CG or the like as illustrated in FIGS. 16B and 16C, or using an actual captured image. In FIGS. 16B and 16C, the depth is represented by displaying the image of a user at the back smaller, and a pseudoscopic viewer can thereby intuitively recognize an appropriate position (viewing zone).

Display Example 3

Further, when a viewer moves to the pseudoscopic position from the orthoscopic position (viewing zone), position information for guiding the viewer may be presented on the display 100a so as to guide the viewer to the orthoscopic position more effectively. In FIG. 16C, the pseudoscopic area is shaded so that the orthoscopic area is easily recognizable. A pseudoscopic viewer B2 can thereby move to an appropriate position (viewing zone) more easily.

As illustrated in the display examples 1 to 3, timing to display the guiding information by the OSD image as a 2D image may be real time. Further, 2D display timing may be set so that viewing of content is not interfered with by display of the position information during the viewing. Setting may be made not to perform 2D display, and the guiding information by the OSD image is not displayed as a 2D image in this case.

If the viewing zone calculation unit 150 can acquire image information (face recognition information) obtained from the camera 200 and identification information of a viewer and pre-registered pupillary distance (interocular distance) information of each viewer as attribute information of the viewer by attribute determination from the attribute information storage unit 180 of FIG. 9 according to the second embodiment, the viewing zone calculation unit 150 can calculate a more accurate orthoscopic position for each viewer based on those information.

Further, in the environment where there is a user who is not looking at the display 100a as found by the camera 200 and the above-described attribute determination, guiding information for the user may be not displayed, so that the display is simplified.

When a user exists in the pseudoscopic position, it is feasible to prompt the user to move by playing a sound to the user. Further, it is feasible to notify a plurality of viewers of being inside the pseudoscopic zone independently of one another by playing a tone or melody preset for each viewer.

In the case where a user denies moving in spite of recognition of being in the pseudoscopic position, display of a view image in a viewing zone closest to the target viewing zone where images are most viewable to a plurality of users, among a plurality of viewing zones obtained when switching mapping onto the stereoscopic display 100a, may be selected and output to the stereoscopic display 100a by using the control method of the stereoscopic display device 100 according to the first to fourth embodiments.

As described above, even in the situation where a plurality of viewers are viewing the autostereoscopic display 100a, the stereoscopic display device 100 according to the embodiment can guide the viewers to the orthoscopic zone simply by presenting the guiding information of the viewing position to the users without the need for any complicated operation such as aligning an eye position with a marker as in related art, thereby reducing an uncomfortable viewing environment due to the pseudoscopic phenomenon.

As described above, even in the situation where a plurality of viewers are viewing the autostereoscopic display 100a, the stereoscopic display device 100 according to the embodiment can guide the viewers to the orthoscopic zone simply by presenting the guiding information of the viewing position to the users without the need for any complicated operation such as aligning an eye position with a marker as in related art, thereby reducing an uncomfortable viewing environment due to the pseudoscopic phenomenon. Specifically, by displaying an area for 2D display by using OSD on the autostereoscopic 3D display, and displaying viewer position information obtained from the camera and the face recognition functional unit and viewing zone information obtained from the viewing zone calculation unit that calculates position information where comfortable viewing is possible from a design value of the autostereoscopic 3D display and a multi-view image output state within the 2D display area, it is possible to prompt the viewer to move to the viewing zone, which is a comfortable viewing position. Further, the information presented in the 2D display area is an image created on the basis of the image obtained from the camera, and an icon identifying each viewer is displayed by the face recognition function, so that each viewer can easily recognize whether his/her position is the orthoscopic position or the pseudoscopic position.

A command to each unit of the functional block according to each embodiment is executed by a dedicated control device or a CPU (not shown) that executes a program. The program for executing each processing described above is prestored in ROM or nonvolatile memory (both not shown), and the CPU reads and executes each program from such memory to thereby implement the function of each unit of the stereoscopic display device.

In the first to fifth embodiments described above, the operations of the respective units are related to each other and may be replaced with a series of operations in consideration of the relation to each other. The embodiment of the stereoscopic display device can be thereby converted into the embodiment of a control method of the stereoscopic display device.

Although preferred embodiments of the present disclosure are described in detail above with reference to the appended drawings, the present disclosure is not limited thereto. It should be understood by those skilled in the art that various modifications, combinations, sub-combinations and alterations may occur depending on design requirements and other factors insofar as they are within the scope of the appended claims or the equivalents thereof.

Although the position of a viewer or the distance from the display to a viewer is calculated using image processing in the above embodiments, the present disclosure is not limited thereto. For example, the position information and the distance information may be acquired using infrared rays or the like. Any method may be used as long as the distance from the display plane to a viewer is obtained.

Further, although a view video guided to the right eye and a view video guided to the left eye are controlled using the lenticular lens or the parallax barrier, any other mechanism may be used as long as a stereoscopic video can be viewed with naked eyes.

It should be noted that, in this specification, the steps shown in the flowchart include not only the processing executed in chronological order according to the sequence described therein but also the processing executed in parallel or individually, not necessarily processed in chronological order. Further, the steps processed in chronological order can be performed in a different sequence as appropriate depending on the circumstances.

The stereoscopic display device in each embodiment described above is an example of the display device according to the embodiment of the present disclosure. The position information acquisition unit in each embodiment described above is an example of the acquisition unit according to the embodiment of the present disclosure. The viewing zone calculation unit in each embodiment described above is an example of the calculation unit according to the embodiment of the present disclosure. The multi-view image control unit is an example of the control unit according to the embodiment of the present disclosure.

It is noted that the position information acquisition unit is an example of the acquisition unit of claims. It is also noted that the viewing zone calculation unit and target viewing zone calculation unit are examples of a calculation unit of claims. It is also noted that the multi-view image control unit is an example of the control unit of claims.

The present application contains subject matter related to that disclosed in Japanese Priority Patent Application JP 2010-143867 filed in the Japan Patent Office on Jun. 24, 2010, the entire content of which is hereby incorporated by reference.

What is claimed is:

1. A display device comprising:
a display unit which periodically arranges and displays a plurality of view images;
an acquisition unit which acquires information on personal attributes of a plurality of current observers;
a calculation unit which sets a target viewing zone based on the information on the personal attributes of the plurality of current observers; and
a control unit which selects an arrangement of the view images that gives a viewing zone that most closely matches the target viewing zone,
wherein the acquisition unit is configured to identify ones of the plurality of current observers based on the information on personal attributes of the plurality of current observers,
wherein the acquisition unit is configured to associate a priority ranking with at least one of the plurality of current observers identified by the acquisition unit,
wherein the calculation unit calculates potential viewing zones and chooses therefrom the target viewing zone based on a priority ranking of current observers,
wherein the acquisition unit acquires information on positions of the plurality of current observers, and
wherein the calculation unit selects the target viewing zone from the potential viewing zones such that a score associated therewith is maximize, the score corresponding to a weighted sum of the number of current observers who are located in the target viewing zone, where weights are allocated based on the priority ranking of current observers.

2. A display device comprising:
a display unit that displays N>2 view images simultaneously in a periodic arrangement;
an acquisition unit that acquires information on positions of a plurality of current observers;
a calculation unit that calculates potential viewing zones and selects therefrom a target viewing zone based on the information on the positions of the plurality of current observers; and
a control unit that selects the periodic arrangement of the view images that the display unit displays from at least N potential periodic arrangements such that the selected periodic arrangement gives an actual viewing zone that most closely matches the target viewing zone,
wherein the calculation unit selects the target viewing zone from the potential viewing zones such that the number of current observers who are located in the target viewing zone is maximized,
wherein the calculation unit determines that a satisfactory viewing zone cannot be achieved when the target viewing zone does not satisfy a condition that a number of current observers who are not located therein is less than a threshold value,
wherein when the calculation unit determines that a satisfactory viewing zone cannot be achieved, the calculation unit notifies the control unit that a satisfactory viewing zone cannot be achieved,
wherein the control unit causes the display unit to display in two-dimensional mode in response to the notification, and
wherein a value of the threshold value is variably selectable by a user.

3. The display device according to claim 2,
wherein, when the control unit causes the display unit to display in two-dimensional mode in response to the calculation unit determining that a satisfactory viewing zone cannot be achieved, the two-dimensional display comprises a guidance image in 4D mode that provides information indicating how the plurality of current observers could move such that they are located in the target viewing zone.

4. The display device according to claim 3,
wherein the guidance image presents a graphical representation of the location of the target viewing zone and a graphical representation of the plurality of current observers,
wherein, in the guidance image, a location of the graphical representation of the plurality of current observers relative to the graphical representation of the location of the target viewing zone corresponds in real time to a location of the plurality of current observers relative to the target viewing zone.

5. A display device comprising:
a display unit which periodically arranges and displays a plurality of view images;
an acquisition unit which acquires observer information comprising information on personal morphological attributes of a plurality of current observers;
a storage unit configured to store user identification information of at least one user, where the user identification information for a given user includes information on personal morphological attributes of the given user;
a calculation unit configured to determine an identity of at least one of the plurality of current observers by comparing the acquired observer information with stored user identification information, and to select a target viewing zone from among a plurality of potential viewing zones based on the determined identity of the at least one of the plurality of current observers; and
a control unit which selects an arrangement of the view images that gives a viewing zone that most closely matches the target viewing zone.

6. The display device according to claim 5,
wherein the calculation unit is configured to associate a priority ranking with at least one of the plurality of current observers whose identity has been determined by the calculation unit, and
wherein the calculation unit chooses the target viewing zone from among the plurality of potential viewing zones based on a priority ranking of current observers.

7. The display device according to claim 6,
wherein the acquisition unit acquires information on positions of the plurality of current observers, and
wherein the calculation unit selects the target viewing zone from the potential viewing zones such that a score associated therewith is maximize, the score corresponding to a weighted sum of the number of current observers who are located in the target viewing zone, where weights are allocated based on the priority ranking of current observers.

8. The display device according to claim 6,
wherein the storage unit stores priority information in association with the user identification information, and
the calculation unit associates the priority ranking with the at least one of the plurality of current observers whose identity has been determined on the basis of the stored priority information.

9. The display device according to claim 8,
wherein the calculation unit associates a priority ranking with at least one of the plurality of current observers on the basis of user input inputted contemporaneously to the calculation unit choosing the target viewing zone.

10. The display device according to claim 6,
wherein the acquisition unit acquires information on positions of the plurality of current observers,
wherein the priority rankings including a highest priority ranking,
wherein the calculation unit determines a subset of the potential viewing zones, the subset consisting of those ones of the potential viewing zones for which no observers having a highest priority ranking associated therewith are located outside of the respective potential viewing zone, and selects from the subset the target viewing zone so that the number of current observers who are located in the target viewing zone is maximized.

11. The display device according to claim 10,
wherein the calculation unit determines that a satisfactory viewing zone cannot be achieved when none of the potential viewing zones satisfies a condition that none of the observers having a highest priority ranking are located outside of the respective potential viewing zone, and
wherein, when the calculation unit determines that a satisfactory viewing zone cannot be achieved, the control unit causes the display unit to display in two-dimensional mode.

12. The display device according to claim 11,
wherein the calculation unit further determines that a satisfactory viewing zone cannot be achieved when none of the potential viewing zones constituting the subset satisfies a condition that a number of current observers who are not located therein is less than a threshold value.

13. The display device according to claim 12,
wherein a value of the threshold value is variably selectable by a user.

14. The display device according to claim 11,
wherein, when the control unit causes the display unit to display in two-dimensional mode in response to the calculation unit determining that a satisfactory viewing zone cannot be achieved, the two-dimensional display comprises a guidance image that presents a graphical representation of the location of the target viewing zone and a graphical representation of the plurality of current observers,
wherein, in the guidance image, a location of the graphical representation of the plurality of current observers relative to the graphical representation of the location of the target viewing zone corresponds in real time to a location of the plurality of current observers relative to the target viewing zone.

15. The display device according to claim 5,
wherein the information on personal morphological attributes of the given user includes information relating to distinguishing features of the given user's face detected through facial recognition.

16. The display device according to claim 5,
wherein the user identification information includes a name of the user.

17. The display device according to claim 5,
wherein the user identification information includes familial relationship information.

18. The display device according to claim 5,
wherein the user identification information includes an age of the user.

* * * * *